United States Patent
Tsukagoshi

(10) Patent No.: US 9,979,985 B2
(45) Date of Patent: May 22, 2018

(54) TRANSMISSION DEVICE, TRANSMITTING METHOD, RECEPTION DEVICE, AND RECEIVING METHOD

(71) Applicant: Saturn Licensing LLC, New York, NY (US)

(72) Inventor: Ikuo Tsukagoshi, Tokyo (JP)

(73) Assignee: Saturn Licensing LLC, New York, NY (US)

(*) Notice: Subject to any disclaimer, the term of this patent is extended or adjusted under 35 U.S.C. 154(b) by 0 days. days.

(21) Appl. No.: 14/440,461

(22) PCT Filed: Dec. 4, 2013

(86) PCT No.: PCT/JP2013/082579
§ 371 (c)(1),
(2) Date: May 4, 2015

(87) PCT Pub. No.: WO2014/091984
PCT Pub. Date: Jun. 19, 2014

(65) Prior Publication Data
US 2015/0281740 A1   Oct. 1, 2015

(30) Foreign Application Priority Data
Dec. 13, 2012   (JP) .................... 2012-271888

(51) Int. Cl.
*H04N 19/85* (2014.01)
*H04N 19/70* (2014.01)
(Continued)

(52) U.S. Cl.
CPC .......... *H04N 19/85* (2014.11); *H04N 19/172* (2014.11); *H04N 19/179* (2014.11); *H04N 19/46* (2014.11);
(Continued)

(58) Field of Classification Search
None
See application file for complete search history.

(56) References Cited

U.S. PATENT DOCUMENTS

| 5,852,679 A | 12/1998 | Shimizu | |
|---|---|---|---|
| 2006/0104346 A1* | 5/2006 | Li | H03M 7/4006 375/240.01 |

(Continued)

FOREIGN PATENT DOCUMENTS

| EP | 0 654 759 A2 | 5/1995 |
|---|---|---|
| EP | 2 086 216 A1 | 8/2009 |

(Continued)

OTHER PUBLICATIONS

Singaporean Search Report and Written Opinion dated Jun. 2, 2016 in Patent Application No. 11201504459Q.

(Continued)

*Primary Examiner* — Reza Aghevli
(74) *Attorney, Agent, or Firm* — Oblon, McClelland, Maier & Neustadt, L.L.P.

(57) ABSTRACT

The technology is directed to appropriately executing banding suppression processing on a receiving side. A container having a predetermined format and including a video stream including encoded image data is transmitted. In the video stream, information related to banding suppression processing for the image data is inserted. The information includes, for example, information indicating whether the banding suppression processing has been applied to the image data, and information indicating whether banding suppression processing should be applied to the image data. On the receiving side, the banding suppression processing can be controlled based on the information related to banding (Continued)

suppression processing transmitted from the transmitting side, and the banding suppression processing can be appropriately executed.

18 Claims, 22 Drawing Sheets

(51) Int. Cl.
    *H04N 19/46*       (2014.01)
    *H04N 21/00*       (2011.01)
    *H04N 19/86*       (2014.01)
    *H04N 19/172*     (2014.01)
    *H04N 19/179*     (2014.01)

(52) U.S. Cl.
    CPC ............. *H04N 19/70* (2014.11); *H04N 19/86* (2014.11); *H04N 21/00* (2013.01)

(56) References Cited

U.S. PATENT DOCUMENTS

| | | | |
|---|---|---|---|
| 2006/0256851 A1* | 11/2006 | Wang | H04N 21/234327 375/240.01 |
| 2007/0047658 A1 | 3/2007 | Tourapis et al. | |
| 2007/0201560 A1* | 8/2007 | Segall | H04N 19/61 375/240.24 |
| 2007/0223813 A1* | 9/2007 | Segall | H04N 1/6027 382/166 |
| 2009/0097558 A1* | 4/2009 | Ye | H04N 19/176 375/240.13 |
| 2009/0180555 A1 | 7/2009 | Sun et al. | |
| 2009/0196525 A1 | 8/2009 | Tsukamoto et al. | |
| 2010/0074328 A1* | 3/2010 | Zuo | H04N 19/172 375/240.03 |
| 2010/0079482 A1 | 4/2010 | Tsukamoto et al. | |
| 2010/0208810 A1* | 8/2010 | Yin | H04N 19/105 375/240.12 |
| 2010/0220796 A1* | 9/2010 | Yin | H04N 19/159 375/240.29 |
| 2013/0084104 A1 | 4/2013 | Maeda | |
| 2013/0188707 A1* | 7/2013 | Shimizu | H04N 13/0048 375/240.12 |

FOREIGN PATENT DOCUMENTS

| | | | |
|---|---|---|---|
| JP | 2007-257641 A | | 10/2007 |
| JP | 2009-207113 A | | 9/2009 |
| JP | 2010-514315 A | | 4/2010 |
| JP | 2012-151562 A | | 8/2012 |
| RU | 2450298 | | 5/2012 |
| WO | WO 2005/032142 A1 | | 4/2005 |
| WO | WO 2012/113574 A1 | | 8/2012 |

OTHER PUBLICATIONS

Extended European Search Report dated Jun. 9, 2016 in Patent Application No. 13861777.4.
"Text of ISO/IEC 14496-10:200X / FDIS Advanced Video Coding (4$^{th}$ Edition)", JVT, No. N9198, XP030015692, Jul. 2007, pp. 563.
Alper Koz, et al., "Optimized Tone Mapping with Perceptually Uniform Luminance Values for Backward-Compatible High Dynamic Range Video Compression", Visual Communications and Image Processing, Nov. 27, 2012, XP032309206, 6 Pages.
Andrew Segall, "Tone Mapping SEI Message", Sharp Labs of America, Joint Video Team (JVT) of ISO/IEC MPEG & ITU-T VCEG (ISO/IEC JTC1/SC29/WG11 and ITU-T SG16 Q.6) JVT-T060 JVT-T060.doc, XP030006547, Jul. 2006, pp. 1-13.
Gary J. Sullivan, "New Standardized Extensions of MPEG4-AVC/H.264 for Professional-Quality Video Applications", IEEE International Conference, XP031157666, Sep. 1, 2007, pp. I 13-I 16.
U.S. Appl. No. 14/764,768, filed Jul. 30, 2015, Tsukagoshi.
International Search Report dated Feb. 18, 2014 in PCT/JP2013/082579 (with English language translation).
Office Action dated Nov. 9, 2017 in Russian Patent Application No. 2015121698 (With English Translation).
Written Opinion dated Dec. 12. 2016 in Singaporean Patent Application No. 11201504459Q.

* cited by examiner

FIG. 4A

HEAD ACCESS UNIT OF GOP

ACCESS UNIT DATA STRUCTURE

| AU Delimiter (ONE) | SPS (ONE) | PPS (ONE) | SEIs | Slices(Primary Coded Picture) (ONE OR MORE) | Filler data (ONE) | End of sequence (ONE) |

SEIs expansion:
| Buffering period SEI message (ONE) | Recovery point SEI message (ESSENTIAL ONLY IN CASE OF open GOP, ONE) | Picture timing SEI message (ONE) | Pan-scan rectangle SEI message (ONE) | Decoded reference Picture marking SEI message (ONE) | Picture processing SEI message (ONE) |

☐ : ESSENTIAL
┌┄┐
└┄┘ : NOT ESSENTIAL

FIG. 4B

ACCESS UNIT OF GOP OTHER THAN HEAD ACCESS UNIT

| AU Delimiter (ONE) | PPS (ONE) | SEIs | Slices(Primary Coded Picture) (ONE OR MORE) | Filler data (ONE) | End of sequence (ONE) |

SEIs expansion:
| Picture timing SEI message (ONE) | Pan-scan rectangle SEI message (ONE) | Decoded reference Picture marking SEI message (ONE) | Picture processing SEI message (ONE) |

| Syntax | No. of Bits | Format |
|---|---|---|
| user_data_unregistered (size) { | | |
| uuid_iso_iec_11578 | 128 | uimslbf |
| for( i = 16; i < payloadSize; i++ ) | | |
| user_data_payload_byte | 8 | bslbf |
| } | | |

FIG.5A

| Syntax | No. of Bits | Format |
|---|---|---|
| picture_processing_data () { | | |
| userdata_id | 16 | uimslbf |
| window_attribute_sei_length | 8 | bslbf |
| Picture processing_sei () | | |
| } | | |

Picture processing SEI syntax

| Syntax | No. of Bits | Format |
|---|---|---|
| Picture processing_SEI( ) { | | |
|   tone_process_preferred | 1 | bslbf |
|   levels_scaled | 1 | bslbf |
|   levels_before_encoding | 2 | bslbf |
|   anti_banding_processed | 1 | bslbf |
|   banding_process_type | 3 | bslbf |
| } | | |

FIG. 7

Picture processing SEI    semantics tone_process_preferred (1 bit)    INDICATE WHETHER banding SUPPRESSION PROCESSING SHOULD BE APPLIED
    1    IMAGE IMPROVEMENT IS EXPECTED BY APPLYING banding SUPPRESSION PROCESSING
    0    PROCESSING IS NOT NECESSARY levels_scaled (1 bit)    INDICATE WHETHER GRADATION NUMBER REDUCING PROCESSING HAS BEEN APPLIED
    1    GRADATION NUMBER REDUCING PROCESSING HAS BEEN APPLIED
    0    GRADATION NUMBER REDUCING PROCESSING HAS NOT BEEN APPLIED levels_before_encoding (2 bits)    INDICATE GRADATION NUMBER BEFORE GRADATION NUMBER REDUCING PROCESSING
    00    8 bits/pixel
    01    10 bits/pixel
    10    12 bits/pixel
    11    14 bits/pixel anti_banding_processed (1 bit)    INDICATE WHETHER BANDING SUPPRESSION PROCESSING HAS BEEN EXECUTED ON TRANSMITTING SIDE
    1    BANDING SUPPRESSION PROCESSING HAS BEEN EXECUTED
    0    BANDING SUPPRESSION PROCESSING HAS NOT BEEN EXECUTED banding_process_type (3 bits)    INDICATE TYPE OF Banding SUPPRESSION PROCESSING
    000    reserved
    001    DITHER METHOD
    010    DENSITY PATTERN METHOD
    011    ERROR DIFFUSION METHOD
    others    reserved picture_processing_descriptor syntax

| Syntax | No. of Bits | Format |
|---|---|---|
| picture_processing descriptor ( ) { | | |
| picture_processing descriptor tag | 8 | uimslbf |
| picture_processing descriptor length | 8 | uimslbf |
| picture_processing_information_existed | 1 | bslbf |
| reserved | 7 | 0x7f |
| } | | |

FIG.8A picture_processing_descriptor semantics

| picture_processing_information_existed (1bit) |
|---|
| INDICATE WHETHER IMAGE PROCESSING HAS BEEN APPLIED TO VIDEO LAYER |
| 1    IMAGE PROCESSING HAS BEEN APPLIED TO VIDEO LAYER (picture_processing_SEI EXISTS) |
| 0    IMAGE PROCESSING HAS NOT BEEN APPLIED TO VIDEO LAYER (picture_processing_SEI DOES NOT EXIST) |

FIG.8B

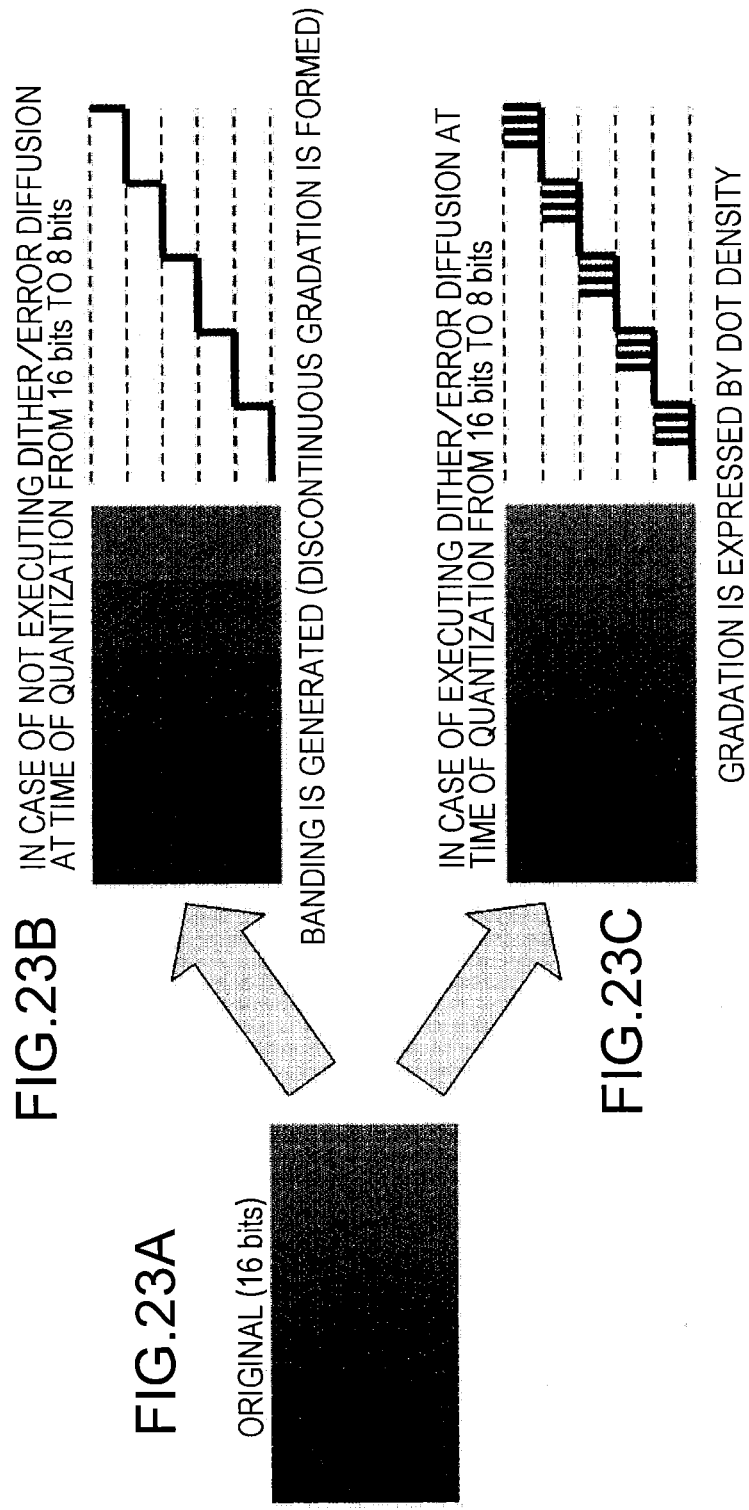

TRANSMISSION DEVICE, TRANSMITTING METHOD, RECEPTION DEVICE, AND RECEIVING METHOD

TECHNICAL FIELD

The present technology relates to a transmission device, a transmitting method, a reception device, and a receiving method, and particularly relates to the transmission device, etc. configured to transmit image data quantized with a limited gradation number.

BACKGROUND ART

There are some image data processing devices configured to execute so-called gradation conversion in which N-bit image data is converted to M-bit image data having a reduced gradation number. Such gradation conversion is executed by, for example, simply cutting off a value of low-order N-M bits of the N-bit pixel data to execute quantization to M-bit pixel data. However, in this case, there may be a problem in which a band-like pattern, namely, banding is sensed due to influence of a quantization error in an area where a pixel value gradually changes like a gradation portion inside an image.

In related arts, various kinds of methods (types) of suppressing such banding are known as banding suppression processing, for example: a random dither method, a systematic dither method, an error diffusion method, etc. (refer to Patent Document 1, for example).

FIG. 22A is a diagram illustrating an exemplary gradation conversion device configured to apply banding suppression processing according to the random dither method. The gradation conversion device includes an arithmetic unit 311, a random noise output unit 312, and a quantization unit 313.

For example, a pixel value IN(x, y) of each pixel (x, y) of 16-bit image data is supplied to the arithmetic unit 311 in raster scan order as target image data of gradation conversion (as an image before gradation conversion). Note that the pixel (x, y) represents a pixel located at x-th from the left and y-th from the top. Further, random noise is supplied to the arithmetic unit 311 from the random noise output unit 312 configured to generate and output the random noise.

The arithmetic unit 311 adds the pixel value IN(x, y) and the random noise, and supplies the quantization unit 313 with an added value obtained as a result thereof. The quantization unit 313 quantizes the added value from the arithmetic unit 311 to, for example, 8 bits, and outputs the 8-bit quantized value obtained as a result thereof as a pixel value OUT(x, y) of each pixel (x, y) of the image data after gradation conversion.

FIG. 22B is a diagram illustrating an exemplary gradation conversion device configured to apply banding suppression processing according to the systematic dither method. The gradation conversion device includes an arithmetic unit 321 and a quantization unit 322.

For example, a pixel value IN(x, y) of each pixel (x, y) of 16-bit image data is supplied to the arithmetic unit 321 in the raster scan order as a target image of gradation conversion. Further, a dither matrix is supplied to the arithmetic unit 321. The arithmetic unit 321 adds the pixel value IN(x, y) and a value of the dither matrix corresponding to the pixel (x, y) having the pixel value IN(x, y), and supplies the quantization unit 322 with an added value obtain as a result thereof.

The quantization unit 322 quantizes the added value from the arithmetic unit 321 to 8 bits, for example, and outputs the 8-bit quantized value obtained as a result thereof as a pixel value OUT(x, y) of the pixel (x, y) of the image data after gradation conversion.

FIG. 22C is a diagram illustrating an exemplary gradation conversion device configured to apply banding suppression processing according to the error diffusion method. The gradation conversion device includes an arithmetic unit 331, a quantization unit 332, an arithmetic unit 333, and a two-dimensional filter 334.

For example, a pixel value IN(x, y) of each pixel (x, y) of 16-bit image data is supplied to the arithmetic unit 331 in the raster scan order as a target image of gradation conversion. Further, output of the two-dimensional filter 334 is supplied to the arithmetic unit 331. The arithmetic unit 331 adds the pixel value IN(x, y) and the output of the two-dimensional filter 334, and supplies the quantization unit 332 and the arithmetic unit 333 with an added value obtained as a result thereof.

The quantization unit 332 quantizes the added value from the arithmetic unit 331 to 8 bits, for example, and outputs the 8-bit quantized value obtained as a result thereof as a pixel value OUT(x, y) of each pixel (x, y) of the image data after gradation conversion.

Further, the pixel value OUT(x, y) output from the quantization unit 332 is also supplied to the arithmetic unit 333. The arithmetic unit 333 subtracts the pixel value OUT(x, y) of the quantization unit 332 from the added value of the arithmetic unit 331 to obtain a quantization error $-Q(x, y)$ generated from quantization at the quantization unit 332, and supplies the same to the two-dimensional filter 334.

The two-dimensional filter 334 is a two-dimensional filter configured to filter a signal, and filters the quantization error $-Q(x, y)$ from the arithmetic unit 333, and outputs a filtering result to the arithmetic unit 331.

In the arithmetic unit 331, the pixel value IN(x, y) and the result of filtering the quantization error $-Q(x, y)$ output from the two-dimensional filter 334 are added as described above. In this case, the quantization error $-Q(x, y)$ is fed back to an input side (arithmetic unit 331) via the two-dimensional filter 334, thereby forming a two-dimensional $\Delta\Sigma$ modulator.

According to the two-dimensional $\Delta\Sigma$ modulator, the quantization error $-Q(x, y)$ is diffused to a high band of space frequency in both a horizontal direction (x-direction) and a vertical direction (y-direction). Therefore, according to the error diffusion method, an image having better quality can be obtained as an image after gradation conversion, compared to the random dither method and the systematic dither method.

FIGS. 23A to 23C are diagrams illustrating a relation between banding and the above-described dither/error diffusion. Here, an example is provided in the case where N=16 and M=8, more specifically, gradation is converted by quantizing 16-bit image data to 8-bit image data. In this case, quantization is executed by cutting off lower-order 8 bits of the input 16-bit data.

A case where a gradation image as illustrated in FIG. 23A is input as original 16-bit image data will be described. In the case of not executing the dither or the error diffusion at the time of quantizing the 16-bit image data to 8-bit image data, discontinuity of gradation, namely, banding may be caused as illustrated in FIG. 23B. A cause of such banding is that a flat portion having continuous same pixel values is generated more in the 8-bit case than the 16-bit case due to decrease of resolution as illustrated on the right side of FIG. 23B.

In the case of executing the dither or the error diffusion, flattening of the pixel values is reduced as illustrated on the right side of FIG. 23C. As a result, expressing the gradation closer to the original 16-bit image data can be achieved as illustrated on the left side of FIG. 23C. Thus, it can be grasped that dither and error diffusion are the methods to express the gradation with dot density.

CITATION LIST

Patent Document

Patent Document 1: Japanese Patent Application Laid-Open No. 2009-207113

SUMMARY OF THE INVENTION

Problems to be Solved by the Invention

In an image transmitting/receiving system, banding suppression processing described above can be executed on a transmitting side, and also can be executed on a receiving side. In the case where banding suppression processing is executed on the transmitting side, the banding suppression processing is not necessary on the receiving side while in the case where the banding suppression processing is not executed on the transmitting side, the banding suppression processing is expected to be executed on the receiving side.

The present technology is directed to appropriately executing the banding suppression processing on the receiving side.

Solutions to Problems

According to an aspect of the present technology, a transmission device includes: a transmitting unit configured to transmit a container having a predetermined format and including a video stream including encoded image data; and an information inserting unit configured to insert information related to banding suppression processing for the image data into the video stream.

According to the present technology, the container having the predetermined format and including the video stream including the encoded image data is transmitted by the transmitting unit. For example, the transmitting unit may transmit the container having the predetermined format in response to a request from the receiving side. For example, the container may be a transport stream (MPEG-2 TS) adopted in the digital broadcasting standards. Further, for example, the container may be a container having a MP4 format used in the Internet delivery, or other formats.

The information related to banding suppression processing for the image data is inserted into the video stream by the information inserting unit. For example, the information inserting unit may insert the information related to the banding suppression processing into the video stream per picture or per scene.

For example, the information related to banding suppression processing may include information indicating whether the banding suppression processing has been applied to the image data. Further, in this case, the information related to banding suppression processing may include information indicating a type of the banding suppression processing applied to the image data.

Moreover, for example, the information related to the banding suppression processing may include information indicating whether the banding suppression processing should be applied to the image data. Furthermore, for example, the information related to the banding suppression processing may include information indicating whether gradation number reducing processing has been applied to the image data. Further, in this case, the information related to the banding suppression processing may include information indicating a gradation number before the gradation number reducing processing.

Thus, according to the present technology, the information related to the banding suppression processing for the image data is inserted into the video stream. Therefore, on the receiving side, the banding suppression processing can be appropriately executed based on the information related to the banding suppression processing. For example, control can be made such that the banding suppression processing is executed only in the case where the banding suppression processing has not been executed on the transmitting side. Further, for example, control can be made such that the banding suppression processing is executed only to the image data that should be applied with the banding suppression processing.

Meanwhile, according to the present technology, an identifying information inserting unit configured to insert, for example, into a layer of the container, identifying information indicating whether the information related to the banding suppression processing is inserted into the video stream. In this case, for example, the container is a transport stream, and the identifying information inserting unit may insert the identifying information under a video elementary loop of a program map table included in the transport stream. In this case, a receiver can detect whether the information related to the banding suppression processing is inserted into the video stream without decoding the video stream, and can appropriately extract the information.

Further, according to a different aspect of the present technology, a reception device includes: a receiving unit configured to receive a container having a predetermined format and including a video stream, the video stream including encoded image data and inserted with information related to banding suppression processing for the image data; a decoding unit configured to decode the video stream and obtain image data; a processing unit configured to apply banding suppression processing to the decoded image data; and a control unit configured to control the processing unit based on the information related to banding suppression processing, inserted into the video stream.

According to the present technology, the container having the predetermined format and including the video stream is received by the receiving unit. In this video stream, the encoded image data is included and further the information related to the banding suppression processing for the image data is inserted. The video stream is decoded by the decoding unit, and decoded image data is obtained. The banding suppression processing is applied to the decoded image data by the processing unit. Further, the processing unit is controlled by the control unit based on the information related to the banding suppression processing, inserted into the video stream.

For example, the information related to the banding suppression processing includes information indicating whether the banding suppression processing should be applied to the image data, and information indicating whether the banding suppression processing has been applied to the image data. The control unit may execute control such that the banding suppression processing is applied to the decoded image data in the control unit when the image data is the image data to which the banding suppression processing should be applied and further the banding suppression processing has not been applied to the image data.

Thus, according to the present technology, the banding suppression processing for the decoded image data is controlled based on the information related to the banding suppression processing for the image data, inserted into the video stream. Therefore, the banding suppression processing can be appropriately executed.

Further, according to another different aspect of the present technology, a reception device includes: a receiving unit configured to receive a container having a predetermined format and including a video stream including encoded image data; a decoding unit configured to decode the video stream and obtain image data; a processing unit configured to apply banding suppression processing to the decoded image data; and a control unit configured to control the processing unit such that banding suppression processing is applied to the decoded image data when a gradation number that can be displayed on a display unit configured to display an image based on the decoded image data differs from a bit number of image data in the video stream.

According to the present technology, the container having the predetermined format and including the video stream including the encoded image data is received by the receiving unit. The video stream is decoded by the decoding unit, and decoded image data is obtained. The banding suppression processing is applied to the decoded image data by the processing unit.

Further, the processing unit is controlled by the control unit. In this case, control is made such that the banding suppression processing is applied to the decoded image data when the gradation number that can be displayed on a display unit configured to display an image based on the decoded image data differs from the bit number of the image data in the video stream. With this configuration, the banding suppression processing is appropriately executed.

Effects of the Invention

According to the present technology, banding suppression processing can be appropriately executed on a receiving side.

BRIEF DESCRIPTION OF DRAWINGS

FIGS. 4A and 4B are diagrams for describing a picture processing SEI message inserted into a "SEIs" portion of an access unit.

FIGS. 5A and 5B are diagrams illustrating an exemplary structure (Syntax) of the "picture processing SEI message".

FIG. 6 is a diagram illustrating an exemplary structure (Syntax) of "Picture processing_sei ( )".

FIG. 7 is a diagram illustrating contents (Semantics) of main information in the exemplary structure of "Picture processing_sei ( )".

FIGS. 8A and 8B are diagrams illustrating an exemplary structure (Syntax) of picture processing descriptor (picture_processing descriptor) and contents (Semantics) of main information thereof.

FIGS. 23A to 23C are diagrams for describing a relation between banding and the dither/error diffusion.

MODE FOR CARRYING OUT THE INVENTION

Modes for carrying out the technology (hereinafter referred to as "embodiment") will be described below. Note that the description will be provided in the following order.
1. Embodiment
2. Modified Example 1. Embodiment

[Image Transmitting/Receiving System]

Figure 1:
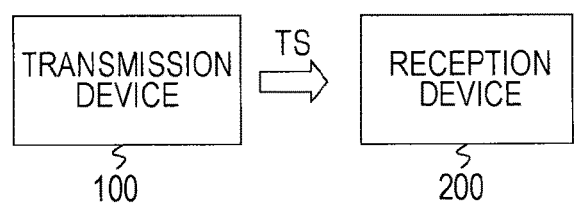
FIG. 1 is a block diagram illustrating an exemplary configuration of an image transmitting/receiving system according to an embodiment.

FIG. 1 a diagram illustrating an exemplary configuration of an image transmitting/receiving system 10 according to an embodiment. The image transmitting/receiving system 10 includes a transmission device 100 and a reception device 200. The transmission device 100 constitutes, for example, a broadcast station and transmits a transport stream TS as a container via a broadcast wave.

The transport stream TS includes a video stream including encoded image data. Further, information related to banding suppression processing for the image data (hereinafter suitably referred to as "banding suppression processing information") is inserted into the video stream. In this case, the banding suppression processing information is inserted into a picture header of the video stream, a user data area of a sequence header, or the like, for example, per picture or per scene.

The banding suppression processing information includes information indicating whether the banding suppression processing has been applied to the image data, and information indicating a type of the banding suppression processing. Further, the banding suppression processing information includes information indicating whether the banding suppression processing should be applied to the image data. Furthermore, the banding suppression processing information includes information indicating whether gradation number reducing processing has been applied to the image data, and information indicating a gradation number before the gradation number reducing processing. The banding suppression processing information will be described later in detail.

Further, identifying information indicating whether the banding suppression processing information is inserted into the video stream is inserted into a layer of the transport stream TS. For example, the identifying information is inserted under a video elementary loop (Video ES loop) of a program map table (PMT) included in the transport stream TS. The identifying information enables a receiving side to detect whether the banding suppression processing information is inserted into the video stream without decoding the video stream, and also appropriately extract the banding suppression processing information. The identifying information will be described later in detail.

The reception device 200 receives the transport stream TS transmitted from the transmission device 100 via the broadcast wave. The reception device 200 applies decoding processing to a video data stream included in the transport stream TS to obtain image data. At this point, the identifying information inserted into the layer of the transport stream TS enables the reception device 200 to detect whether the banding suppression processing information is inserted into the video stream without decoding the video stream.

The reception device 200 applies the banding suppression processing to the decoded image data, and generates image data to be displayed. At this point, the reception device 200 extracts the banding suppression processing information inserted into the video stream, and controls the banding suppression processing based on the banding suppression processing information. For example, when the image data is the image data to which the banding suppression processing should be applied and further the banding suppression processing has not been applied to the image data, control is made so as to apply the banding suppression processing to the decoded image data.

[Configuration of Transmission Device]

Figure 2:
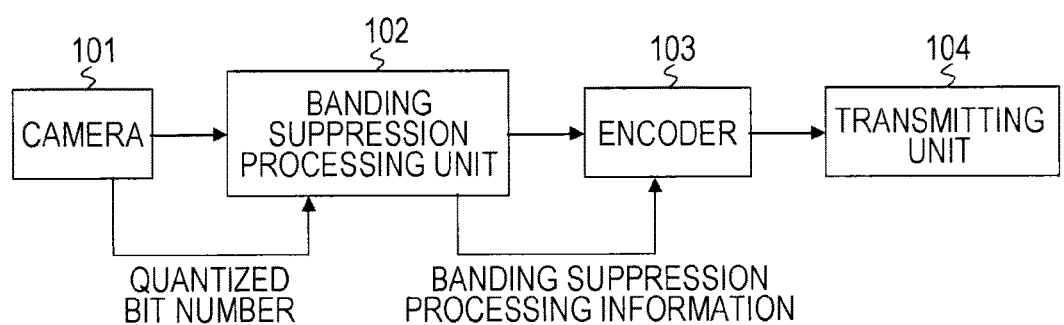
FIG. 2 is a block diagram illustrating an exemplary transmission device constituting the image transmitting/receiving system.

FIG. 2 a diagram illustrating an exemplary configuration of the transmission device 100. The transmission device 100 includes a camera 101, a banding suppression processing unit 102, an encoder 103, and a transmitting unit 104. The camera 101 captures an image of an object, and outputs image data. The banding suppression processing unit 102 applies the gradation number reducing processing and the banding suppression processing to the image data output from the camera 101 in accordance with a quantized bit number (gradation number).

More specifically, when the image data output from the camera 101 is N-bit image data and N>M, the banding suppression processing unit 102 converts the image data to M-bit image data, and also applies the banding suppression processing to output the M-bit image data. Meanwhile, when the image data output from the camera 101 is M-bit image data, the banding suppression processing unit 102 outputs the image data output from the camera 101 as it is.

Figure 3:
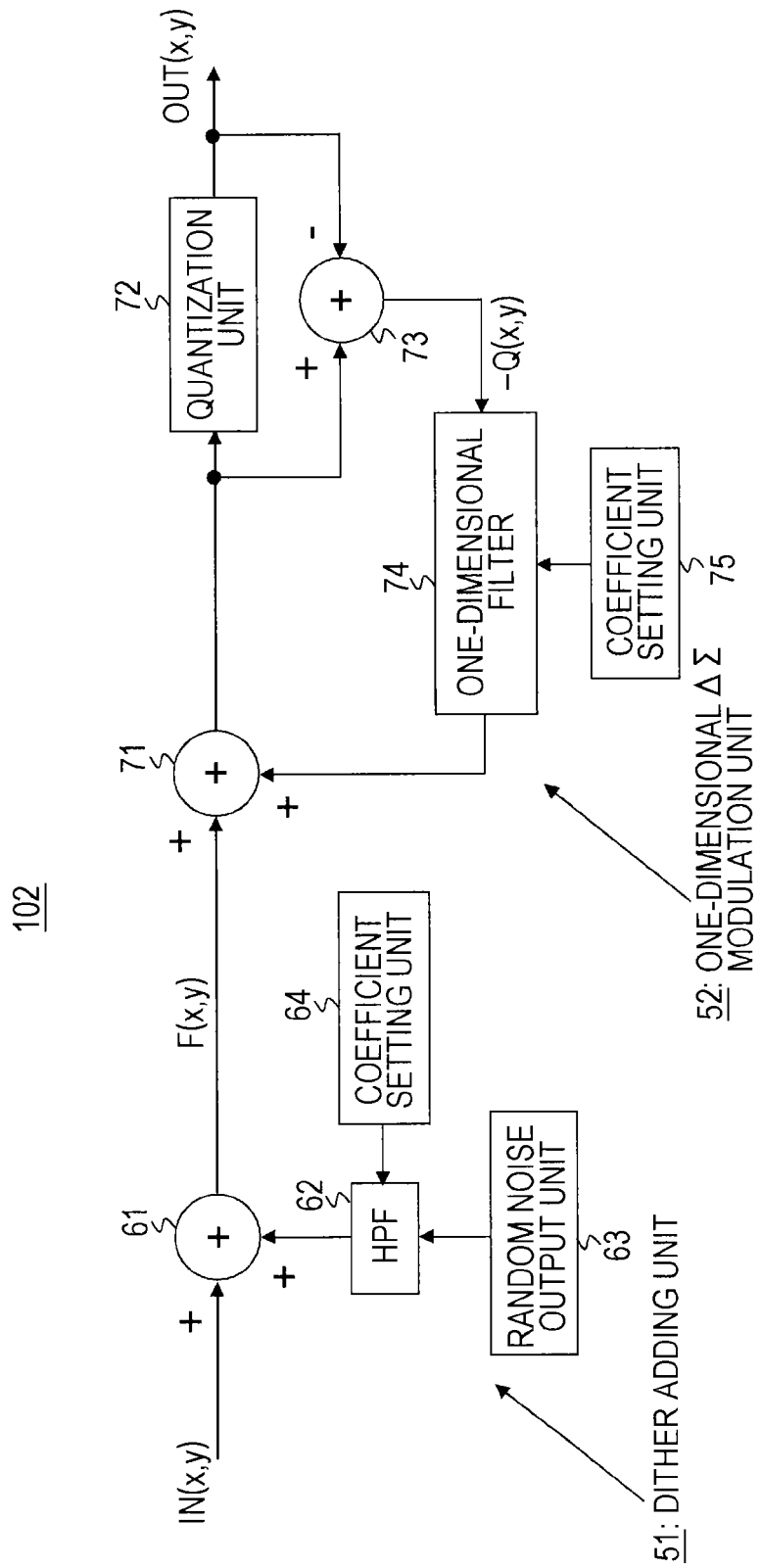
FIG. 3 is a block diagram illustrating an exemplary configuration of a banding suppression processing unit constituting the transmission device.

FIG. 3 is a diagram illustrating an exemplary configuration of the banding suppression processing unit 102. The banding suppression processing unit 102 has a configuration in which a dither adding unit 51 and a one-dimensional LE modulation unit 52 are connected in series. The dither adding unit 51 applies dither to an object image by adding random noise to each pixel value IN(x, y) of input image data received from the camera 101, and supplies the one-dimensional ΔΣ modulation unit 52 with image data. The one-dimensional ΔΣ modulation unit 52 applies one-dimensional ΔΣ modulation to the image data applied with dither and supplied from the dither adding unit 51, and supplies the encoder 103 with each pixel value OUT(x, y) of output image data obtained as a result thereof.

A dither adding unit 51 will be described. The dither adding unit 51 includes an arithmetic unit 61, a high pass filter (HPF) 62, a random noise output unit 63, and a coefficient setting unit 64. The pixel value IN(x, y) of the input image data is supplied to the arithmetic unit 61 in raster scan order. Additionally, output from the hyper pass filter 62 is supplied to the arithmetic unit 61.

The arithmetic unit 61 adds the output from the hyper pass filter 62 to the pixel value IN(x, y) of the input image data, and supplies an added value obtained as a result thereof to the one-dimensional ΔΣ modulation unit 52 as a pixel value F(x, y) of the image data applied with dither. The hyper pass filter 62 filters the random noise output from the random noise output unit 63 based on a filter coefficient set by the coefficient setting unit 64, and supplies the arithmetic unit 61 with a high-frequency component of the random noise obtained as a result of the filtering.

The random noise output unit 63 generates random noise in accordance with, for example, Gaussian distribution, and outputs the random noise to the hyper pass filter 62. The coefficient setting unit 64 determines the filter coefficient of the hyper pass filter 62 based on spatial frequency characteristics of human eyesight or the like, and sets the filter coefficient for the hyper pass filter 62.

In the dither adding unit 51, the filter coefficient for the hyper pass filter 62 is determined based on the spatial frequency characteristics of the human eyesight or the like, and set for the hyper pass filter 62 by the coefficient setting unit 64. Further, in the hyper pass filter 62, product-sum operation or the like is executed with the filter coefficient set by the coefficient setting unit 64 and the random noise output from the random noise output unit 63. By this, the random noise output from the random noise output unit 63 is filtered and a high-frequency component is extracted. The high-frequency component is supplied to the arithmetic unit 61.

In the arithmetic unit 61, the N-bit pixel value IN(x, y) of the input image data and the high-frequency component of the random noise from the hyper pass filter 62 are added, and an added value obtained thereof, for example, an N-bit added value having a same bit number as the input image data or an added value having the same or larger bit number, is supplied to the one-dimensional LE modulation unit 52 as the pixel value F(x, y) applied with dither.

Next, the one-dimensional ΔΣ modulation unit 52 will be described. The one-dimensional ΔΣ modulation unit 52 includes an arithmetic unit 71, a quantization unit 72, an arithmetic unit 73, a one-dimensional filter 74, and a coefficient setting unit 75. The pixel value F(x, y) of the image data applied with dither is supplied to the arithmetic unit 71 from the dither adding unit 51 in the raster scan order. Further, output of the one-dimensional filter 74 is supplied to the arithmetic unit 71.

The arithmetic unit 71 adds the pixel value F(x, y) from the dither adding unit 51 and the output from the one-dimensional filter 74, and supplies an added value obtained as a result thereof to the quantization unit 72 and the arithmetic unit 73. The quantization unit 72 quantizes the added value from the arithmetic unit 71 to M bits. Further, the quantization unit 72 supplies, to the encoder 103 and also to the arithmetic unit 73, an M-bit quantized value (quantized value including a quantization error −Q(x, y)) obtained as a result thereof) as a pixel value OUT(x, y) of output image data after gradation number conversion.

The arithmetic unit 73 subtracts the pixel value OUT(x, y) of the quantization unit 72 from the added value of the arithmetic unit 71, thereby obtaining the quantization error −Q(x, y) generated at quantization at the quantization unit 72, and then supplies the quantization error to the one-dimensional filter 74. The one-dimensional filter 74 is a one-dimensional filter configured to filter a signal, and filters the quantization error −Q(x, y) received from the arithmetic unit 73 and outputs a result of the filtering to the arithmetic unit 71.

Here, in the arithmetic unit 71, the filtering result of the quantization error −Q(x, y) output from the one-dimensional filter 74 and the pixel value F(x, y) are added. The coefficient setting unit 75 determines the filter coefficient for the one-dimensional filter 74 based on the spatial frequency characteristics of the human eyesight or the like, and sets the coefficient for the one-dimensional filter 74.

In the one-dimensional ΔΣ modulation unit 52, the filter coefficient for the one-dimensional filter 74 is determined based on the spatial frequency characteristics of the human eyesight or the like and set for the one-dimensional filter 74 by the coefficient setting unit 75. Further, in the one-dimensional filter 74, product-sum operation or the like is executed with the filter coefficient set by the coefficient setting unit 75 and the quantization error −Q(x, y) output from the arithmetic unit 73. By this, the quantization error −Q(x, y) output from the arithmetic unit 73 is filtered and a high-frequency component of the quantization error −Q(x, y) is extracted. The high-frequency component is supplied to the arithmetic unit 71.

In the arithmetic unit 71, the pixel value F(x, y) from the dither adding unit 51 and the output from the one-dimensional filter 74 are added, and an added value obtained as a result thereof is supplied to the quantization unit 72 and the arithmetic unit 73. In the quantization unit 72, the added value from the arithmetic unit 71 is quantized to M bits, and a M-bit quantized value obtained as a result thereof is supplied to the encoder 103 as the pixel value OUT(x, y) of image data after gradation number conversion, and also supplied to the arithmetic unit 73.

In the arithmetic unit 73, the pixel value OUT(x, y) of the quantization unit 72 is subtracted from the added value of the arithmetic unit 71, thereby obtaining the quantization error −Q(x, y) from the quantization unit 72 included in the pixel value OUT(x, y). The quantization error −Q(x, y) is supplied to the one-dimensional filter 74. In the one-dimensional filter 74, the quantization error −Q(x, y) from the arithmetic unit 73 is filtered, and a result of the filtering is output to the arithmetic unit 71. In the arithmetic unit 71, a filtering result of the quantization error −Q(x, y) output from the one-dimensional filter 74 and the pixel value F(x, y) are added.

In the one-dimensional ΔΣ modulation unit 52, the quantization error −Q(x, y) is fed back to the input side (arithmetic unit 71) via the one-dimensional filter 74, thereby achieving to perform one-dimensional ΔΣ modulation. Therefore, in the one-dimensional ΔΣ modulation unit 52, the one-dimensional ΔΣ modulation is applied to the pixel value F(x, y) from the dither adding unit 51, and the pixel value OUT(x, y) is output as a result of the one-dimensional ΔΣ modulation.

Meanwhile, in the one-dimensional ΔΣ modulation unit 52, the quantization error −Q(x, y) is the quantization error for the pixel value F(x, y), but in the case of acquiring the pixel value OUT(x, y) by applying ΔΣ modulation to the pixel value F(x, y), the quantization error −Q(x, y) for the pixel value F(x, y) is not used and a quantization error for a pixel value more previous than the pixel value F(x, y) (pixel value previously processed) is used in the raster scan order.

Referring back to FIG. 2, the encoder 103 applies encoding, such as MPEG4-AVC (MVC), MPEG2 video, or high efficiency video coding (HEVC), to the M-bit image data output from the banding suppression processing unit 102 to obtain the encoded image data. Further, the video encoder 103 generates a video stream (video elementary stream) including the encoded image data by a stream formatter (not illustrated) disposed a subsequent stage.

At this point, the encoder 103 inserts the banding suppression processing information into the video stream per picture or per scene, for example. The banding suppression processing information is supplied from, for example, the banding suppression processing unit 102. Banding processing information includes, as described above, the information indicating whether the banding suppression processing has been applied to the image data, information indicating a type of the banding suppression processing, information indicating whether the banding suppression processing should be applied to the image data, information whether the gradation number reducing processing has been applied to the image data, information indicating the gradation number before the gradation number reducing processing, and so on.

The transmitting unit 104 packetizes and multiplexes the video stream generated at the encoder 103 and other streams such as an audio stream generated at an audio encoder not illustrated, and generates a transport stream TS. Further, the transmitting unit 104 modulates the transport stream TS by a modulation method suitable for broadcasting, such as QPSK/OFDM, and transmits an RF modulation signal thereof from a transmission antenna.

At this point, the transmitting unit 104 inserts, into a layer of the transport stream TS, the identifying information indicating whether the banding suppression processing information is inserted into the video stream. For example, the identifying information is inserted under the video elementary loop (Video ES loop) of the program map table (PMT) included in the transport stream TS.

Operation of the transmission device 100 illustrated in FIG. 2 will be briefly described. The image data output from the camera 101 is supplied to the banding suppression processing unit 102. In the banding suppression processing unit 102, the gradation number reducing processing and the banding suppression processing are executed in accordance with a quantized bit number (gradation number).

In this case, when the image data output from the camera 101 is N-bit image data and N>M, the image data is converted to the M-bit image data and also the banding suppression processing is applied in the banding suppression processing unit 102, and the M-bit image data is output. On the other hand, when the image data output from the camera 101 is the M-bit image data, the gradation number reducing processing and the banding suppression processing are not executed in the banding suppression processing unit 102, and the image data output from the camera 101 is output as it is.

The image data output from the banding suppression processing unit 102 is supplied to the encoder 103. In the encoder 103, encoding such as MPEG4-AVC (MVC), MPEG2 video, or high efficiency video coding (HEVC) is applied to the M-bit image data output from the banding suppression processing unit 102, and encoded image data is generated. Then, the video stream (video elementary stream) including the encoded image data is generated. At this point, the banding suppression processing information is inserted into the video stream in the encoder 103 per picture or per scene, for example.

The video stream generated in the encoder 103 is supplied to the transmitting unit 104. In the transmitting unit 104, the video stream and other streams such as the audio stream are packetized and multiplexed, and the transport stream TS is generated. At this point, the identifying information indicating whether the banding suppression processing information is inserted into the video stream is inserted into the layer of the transport stream TS. Further, in the transmitting unit 104, the transport stream TS is modulated by the modulation method suitable for broadcasting, such as QPSK/OFDM, and the RF modulation signal thereof is transmitted from the transmission antenna.

[Banding Suppression Processing Information, Identifying Information, and TS Configuration]

As described above, the banding suppression processing information is inserted into the video stream. For example, in the case where the encoding method is MPEG4-AVC or an encoding method like HEVC having a similar encoding structure such as an NAL packet, the banding suppression processing information is inserted into the "SEIs" portion of the access unit (AU) as the SEI message.

In this case, the banding suppression processing information is inserted into as a picture processing SEI message. FIG. 4A is a diagram illustrating a head access unit of a group of pictures (GOP), and FIG. 4B is a diagram illustrating an access unit of the GOP other than the head access unit. The SEI message is encoded at an earlier position on a bit stream compared to slices having encoded pixel data. Therefore, the receiver can make quick control on the banding suppression processing for the image data based on contents of the SEI.

FIG. 5A is a diagram illustrating an exemplary structure (Syntax) of the "picture processing SEI message". "uuid_iso_jec_11578" has an UUID value specified in "ISO/IEC 11578: 1996 AnnexA". "picture_processing_data( )" is inserted into a field of "user_data_payload_byte". FIG. 5B is a diagram illustrating an exemplary structure (Syntax) of the "picture_processing_data( )". "Picture processing_sei( )" is inserted into this structure. "userdata_id" is an identifier of the "Picture processing_sei( )" represented by unsigned 16 bits.

FIG. 6 is a diagram illustrating an exemplary structure (Syntax) of "Picture processing_sei ( )". Further, FIG. 7 is a diagram illustrating contents (Semantics) of main information in the exemplary structure illustrated in FIG. 6. A 1-bit field of "tone_process_preferred" indicates whether the banding suppression processing should be applied to image data. "1" indicates that the banding suppression processing should be applied, that is, image improvement is expected by applying the banding suppression processing. "0" indicates that the banding suppression processing is not necessary.

A 1-bit field of "levels scaled" indicates whether the gradation number reducing processing has been applied to the image data. "1" indicates that the gradation number reducing processing has been applied. "0" indicates that the gradation number reducing processing has not been applied. A 2-bit field of "levels before encoding" indicates the gradation number (bit number) before the gradation number reducing processing. "00" indicates 8-bit/pixel. "01" indicates 10-bit/pixel. "10" indicates 12-bit/pixel. "11" indicates 14-bit/pixel.

A 1-bit field of "anti banding processed" indicates whether the banding suppression processing has been applied on the transmitting side. "1" indicates that the banding suppression processing has been executed. "0" indicates that the banding suppression processing has not been executed. A 3-bit filed of "banding process type" indicates a type of the banding suppression processing. For example, "001" indicates a dither method, "010" indicates a density pattern method, and "011" indicates an error diffusion method.

Further, as described above, the identifying information indicating whether the banding suppression processing information is included in the video stream is inserted under the video elementary loop (Video ES loop) of the program map table (PMT) of the transport stream TS.

FIG. 8A is a diagram illustrating an exemplary structure (Syntax) of picture processing descriptor (picture_processing descriptor) as the identifying information. FIG. 8B is a diagram illustrating contents (Semantics) of the main information in the exemplary structure illustrated in FIG. 8A. An 8-bits field of "picture_processing descriptor tag" indicates a type of descriptor which indicates picture processing descriptor here. An 8-bit field of "picture_processing descriptor length" indicates a length (size) of the descriptor, and indicates the number of following number of bytes as the length of descriptor.

A 1-bit field of "picture_processing_information_existed" indicates whether image processing has been applied to the video layer. "1" indicates that the image processing has been applied to the video layer, more specifically, the picture processing SEI message exists in the video stream. "0" indicates that the image processing has not been applied to the video layer, more specifically, the picture processing SEI message does not exist in the video stream.

Figure 9:
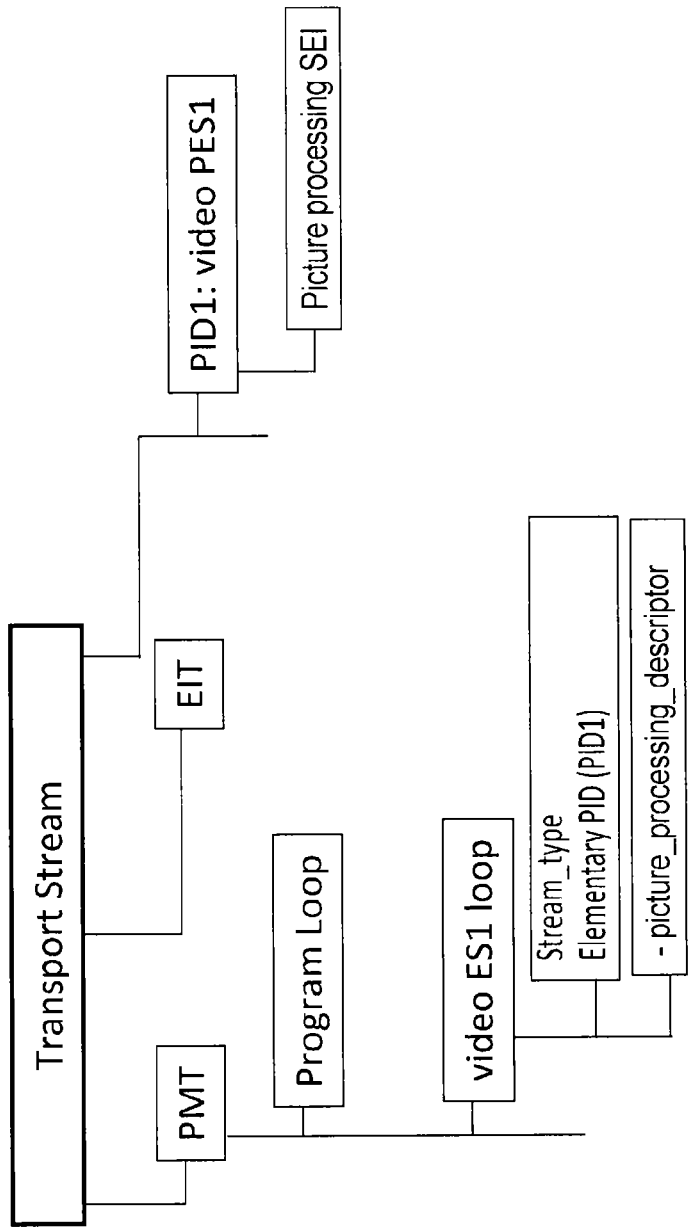
FIG. 9 is a diagram illustrating an exemplary structure of a transport stream TS according to an embodiment.

FIG. 9 is a diagram illustrating an exemplary structure of a transport stream TS. In this example, a portion other than the video stream (video elementary stream) is not illustrated to simplify the drawing. In the transport stream TS, a PES packet "PID1: video PES1" is contained. The banding suppression processing information is inserted into the video stream as the picture processing SEI message (refer to FIG. 6).

Further, in the transport stream TS, the program map table (PMT) is included as the program specific information (PSI). The PSI is information to describe which program each elementary stream included in the transport stream TS belongs to. Further, in the transport stream TS, an event information table (EIT) is included as serviced information (SI) to perform control per event (program).

A program loop to describe information related to an entire program exists in the PMT. Further, an elementary loop having information related to each elementary stream exists in the PMT. In this exemplary structure, the video elementary loop (Video ES loop) exists. In the video elementary loop, information such as a stream type and a packet identifier (PID) is located corresponding to the above-described video stream, and also descriptor describing information related to the video stream is located as well.

The picture processing descriptor (picture processing descriptor) is inserted under the video elementary loop (Video ES loop) of the PMT (refer to FIG. 8A). The descriptor indicates, as described above, whether the banding suppression processing information, namely, the picture processing SEI message is inserted into the video stream.

Meanwhile, according to the transmission device 100 illustrated in FIG. 2, the example of transmitting the image data of the camera 101 is provided. However, instead of the camera 101, there may be an example where a storage device in which the image data is recorded is disposed. In such a case, the image data read from the storage is transmitted.

Further, according to the transmission device 100 illustrated in FIG. 2, the example where the gradation number reducing processing is also executed in the banding suppression processing unit 102 is provided. However, the gradation number reducing processing may also be executed in a previous stage or a subsequent stage of the banding suppression processing unit 102. In that sense, the gradation number reducing processing may be executed inside the encoder 103.

Further, according to the transmission device 100 illustrated in FIG. 2, the example of executing the banding suppression processing in the banding suppression processing unit 102 by the random dither method is provided (refer to FIG. 3). However, according to the present technology, the banding suppression processing is not limited to the random dither method, and other methods such as the systematic dither method and the error diffusion method may be applied, too.

Configuration of Reception Device

Figure 10:
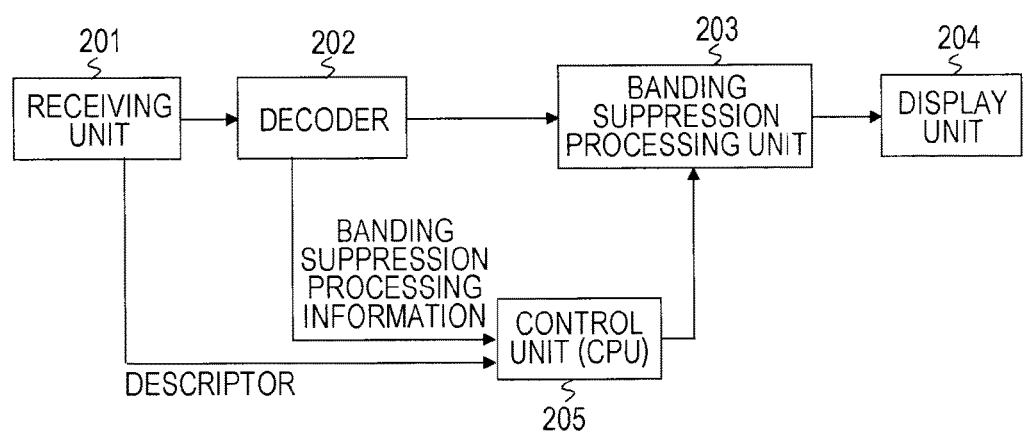
FIG. 10 is a block diagram illustrating an exemplary configuration of a reception device constituting the image transmitting/receiving system.

FIG. 10 a diagram illustrating an exemplary configuration of the reception device 200. The reception device 200 includes a receiving unit 201, a decoder 202, a banding suppression processing unit 203, a display unit 204, and a control unit 205. The control unit 205 includes a CPU (Central Processing Unit) and controls the respective units of the reception device 200.

The receiving unit 201 demodulates the RF modulation signal received at a receiving antenna, and obtains a transport stream TS. Then, the receiving unit 201 extracts each stream such as the video stream included in the transport stream TS. Further, the receiving unit 201 extracts picture processing descriptor (picture_processing descriptor) from the transport stream TS (refer to FIG. 8A), and transmits the same to the control unit 205. The control unit 205 recognizes, from description of the descriptor, whether the banding suppressing information is inserted into the video stream.

The decoder 202 applies decoding processing to the video stream extracted at the receiving unit 201, and generates image data. Further, the decoder 202 extracts the banding suppression processing information in accordance with the picture processing SEI message inserted into the video stream, and transmits the information to the control unit 205.

The banding suppression processing unit 203 applies the banding suppression processing to the image data output from the decoder 202 under control of the control unit 205. While detailed description therefor will be omitted here, the banding suppression processing unit 203 has the same configuration as the banding suppression processing unit 102 in the above-described transmission device 100. The display unit 204 displays an image based on the image data output from the banding processing unit 203. The display unit 204 is formed of a display such as a liquid crystal display (LCD).

The control unit 205 controls the operation of the banding suppression processing unit 203 based on the banding suppression processing information and the like. For example, when the image data is the image data to which the banding suppression processing should be applied and further the banding suppression processing has not been applied to the image data, the control unit 205 controls the banding suppression processing to be applied to the decoded image data.

Here, in the case where the banding suppression processing has been executed on the transmitting side, the bit number of the image data before the gradation number reducing processing before encoding is larger than the bit number of the encoded image data (bit number constituting a stream as "slice data"). Further, compared to the bit number of the decoded image data, the bit number of the encoded image data is equal or larger (it depends on whether the decoder faithfully executes decoding in accordance with the bit number of the slice data or executes simple decoding). In the case where the decoder 202 faithfully decodes the video stream, the bit number of the encoded image data becomes equal to the bit number of the decoded image data.

In the case of defining that the bit number of the image data before the gradation number reducing processing before encoding is a first bit number, the bit number of the encoded image data is a second bit number, and the bit number of the decoded image data is a third bit number, a relation among these bit numbers is represented by the following Expression (1).

$$\text{First bit number} > \text{Second bit number} \geq \text{Third bit number} \quad (1)$$

The banding suppression processing unit 203 executes the banding suppression processing under the control of the control unit 205 in the following manner, for example.

(1) In the case where the bit number of the image data before the gradation number reducing processing before encoding is larger than the bit number of the encoded image data and the banding suppression processing has not been executed on the transmitting side, the banding suppression processing is executed. In this case, a type of filter can be changed in accordance with the bit number of the image data before the gradation number reducing processing before encoding.

(2) In the case where the bit number of the encoded image data differs from the bit number of the decoded image data, noise may be generated by the decoding processing. Therefore, to take measures against the noise, suppression processing having been executed on the transmitting side is returned to an undone state, and the suppression processing is executed again.

(3) In the case where the bit number of the decoded image data differs from a bit number that can be displayed, the filter of the suppression processing is changed in accordance with a level of difference.

Figure 11:
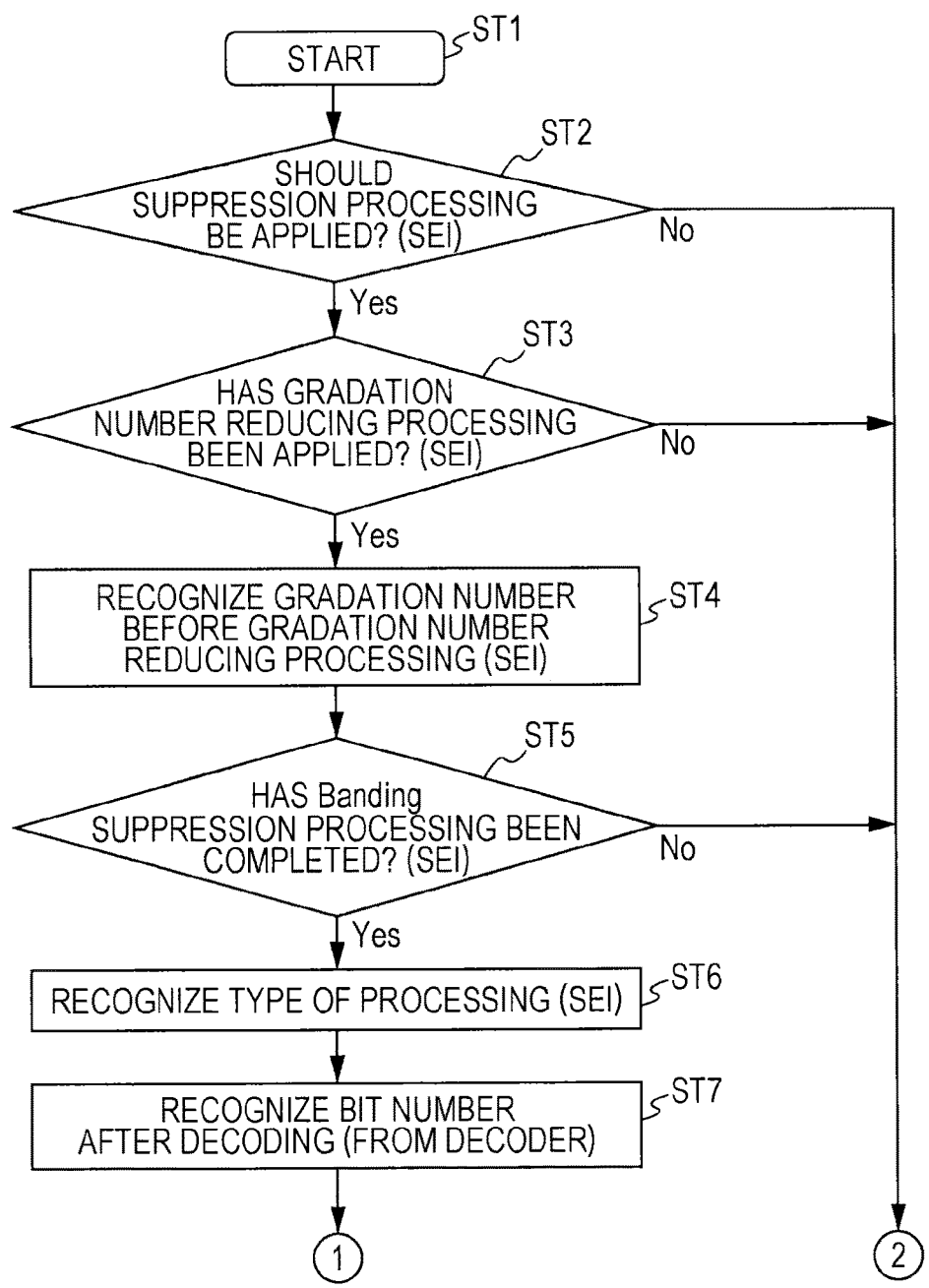
FIG. 11 is a flowchart (1/2) illustrating an exemplary control procedure of banding suppression processing per picture in a control unit of the reception device.
Figure 12:
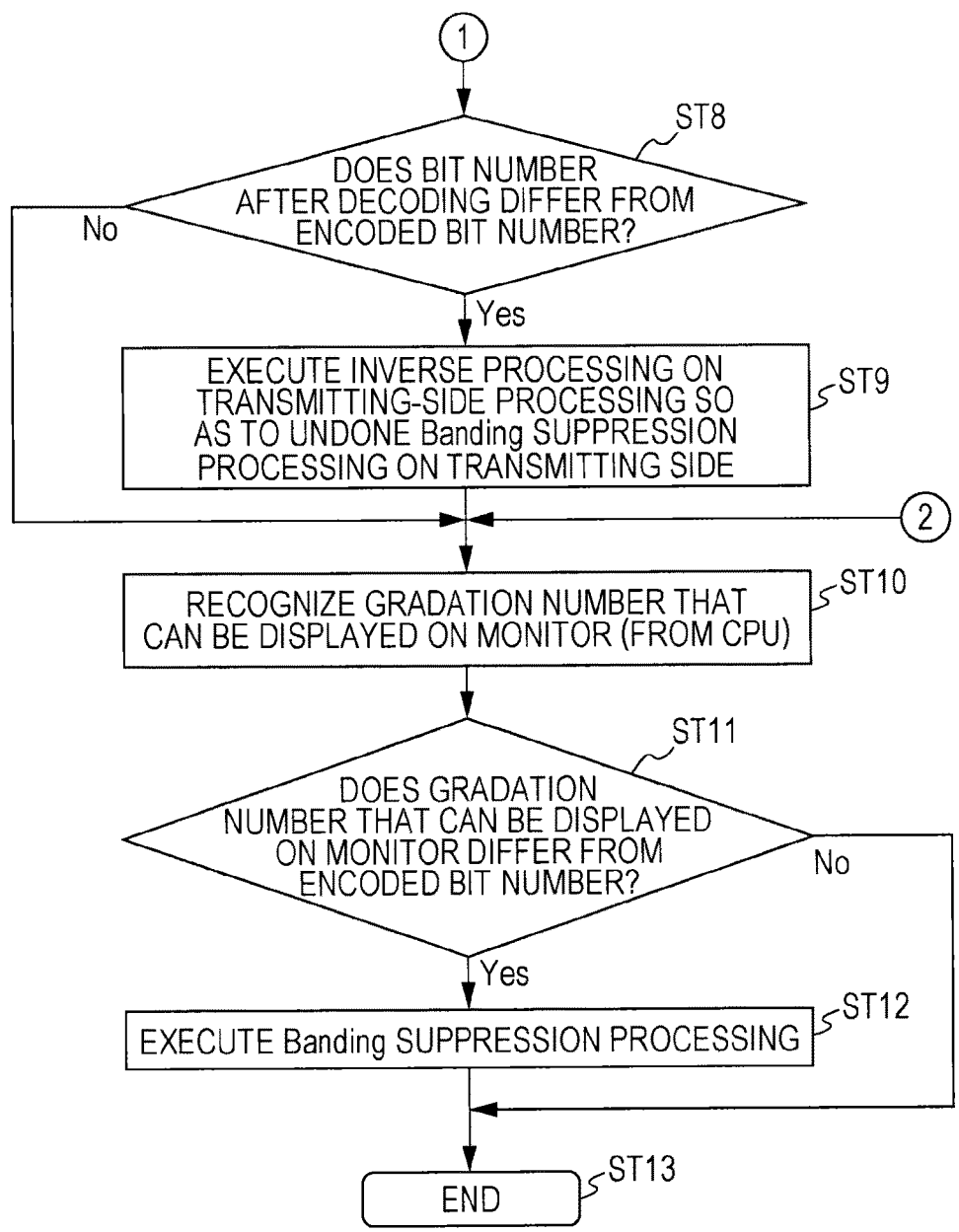
FIG. 12 is the flowchart (2/2) illustrating the exemplary control procedure of banding suppression processing per picture in the control unit of the reception device.

FIGS. 11 and 12 are flowcharts illustrating an exemplary control procedure of the banding suppression processing per picture in the control unit 205. The control unit 205 starts control processing in Step ST1, and then proceeds to processing in Step ST2. In the Step ST2, the control unit 205 determines whether the banding suppression processing should be applied to the image data. The control unit 205 can make the determination based on the information of "tone_process_preferred" of the picture processing SEI message.

When it is determined that the banding suppression processing is not necessary, the control unit 205 proceeds to processing in Step ST10 immediately. On the other hand, when it is determined that the banding suppression processing should be applied, the control unit 205 proceeds to processing in Step ST3. In the Step ST3, the control unit 205 determines whether the gradation number reducing processing has been applied. The control unit 205 can give this determination based on the information of "levels_scaled" in the picture processing SEI message. When it is determined that the gradation number reducing processing has not been applied, the control unit 205 proceeds to processing in Step ST10 immediately.

Note that the control unit 205 also proceeds to the processing in Step ST10 immediately in the case where no picture processing SEI message is inserted into the video stream and no SEI message is transmitted from the decoder 202. In Step ST10, the control unit 205 recognizes the gradation number that can be displayed on a monitor (display unit 204). The control unit 205 preliminarily stores, for example, functional information of the monitor, and can execute control based on the functional information.

Next, the control unit 205 proceeds to processing in Step ST11. In the Step ST11, the control unit 205 determines whether the gradation number that can be displayed on the monitor (bit number) differs from the encoded bit number (bit number of the image data in the video stream). In the case of determining that there is no difference, the control unit 205 proceeds to Step ST13 immediately, and finishes control processing. In this case, the banding suppression processing is not executed in the banding suppression processing unit 203, and the input image data is output as it is.

On the other hand, in the case of determining there is a difference, the control unit 205 causes the banding suppression processing unit 203 to execute the banding suppression processing in Step ST12. In this case, the filter of the suppression processing is changed in accordance with the level of difference. After the processing in Step ST12, the control unit 205 proceeds to processing in Step ST13 and finishes the control processing.

Further, when it is determined in Step ST3 that the gradation number reducing processing has been applied, the control unit 205 proceeds to processing in Step ST4. In Step ST4, the control unit 205 recognizes the gradation number before the gradation number reducing processing. The control unit 205 can give the recognition based on the information of "levels_before_encoding" in the picture processing SEI message.

Next, the control unit 205 determines in Step ST5 whether the banding suppression processing has been completed. The control unit 205 can give this determination based on the information of "anti_banding_processed_levels_before_encoding" in the picture processing SEI message.

In the case of determining that the banding suppression processing has not been completed, the control unit 205 recognizes the gradation number that can be displayed on the monitor (display unit 204) in Step ST10, and then proceeds to the processing in Step ST11. In the Step ST11, the control unit 205 determines whether the gradation number that can be displayed on the monitor (bit number) differs from the encoded bit number (bit number of the image data in the video stream). In the case of determining that there is no difference, the control unit 205 proceeds to Step ST13 immediately, and finishes control processing. In this case, the banding suppression processing is not executed in the banding suppression processing unit 203, and the input image data is output as it is.

On the other hand, in the case of determining there is a difference, the control unit 205 causes the banding suppression processing unit 203 to execute the banding suppression processing in Step ST12. In this case, the filter of the suppression processing is changed in accordance with the level of difference. Further, in this case, the type of filter is changed in accordance with the gradation number before the gradation number reducing processing recognized in Step ST4. After the processing in Step ST12, the control unit 205 proceeds to processing in Step ST13 and finishes the control processing.

Further, in the case of determining in Step ST5 that the banding suppression processing has been completed, the control unit 205 proceeds to processing in Step ST6. In the Step ST6, the control unit 205 recognizes the type of processing. The control unit 205 can give the recognition based on the information of "banding_process_type" in the picture processing SEI message. Then, the control unit 205 recognizes the bit number after decoding in Step ST7. The control unit 205 can give this recognition based on information from the decoder 202.

Next, the control unit 205 determines in Step ST8 whether the bit number after decoding differs from the encoded bit number. For example, in the case where simple decoding is executed in the decoder 202, the bit numbers are different. When it is determined that there is no difference, the control unit 205 recognizes the gradation number that can be displayed on the monitor (display unit 204) in Step ST10, and then proceeds to the processing in Step ST11.

In the Step ST11, the control unit 205 determines whether the gradation number that can be displayed on the monitor (bit number) differs from the encoded bit number (bit number of the image data in the video stream). In the case of determining that there is no difference, the control unit 205 proceeds to Step ST13 immediately, and finishes control processing. In this case, the banding suppression processing is not executed in the banding suppression processing unit 203, and the input image data is output as it is.

On the other hand, in the case of determining that there is a difference, the control unit 205 causes the banding suppression processing unit 203 to execute the banding suppression processing in Step ST12. In this case, the filter of the suppression processing is changed in accordance with the level of difference. Further, in this case, the type of filter is changed in accordance with the gradation number before the gradation number reducing processing recognized in Step ST4. Also, in this case, the filter of the suppression processing is changed in accordance with the bit number after decoding recognized in Step ST7 and the gradation number that can be displayed on the monitor recognized in Step ST10. After the processing in Step ST12, the control unit 205 proceeds to processing in Step ST13 and finishes the control processing.

Further, when it is determined that there is a difference in Step ST8, the control unit 205 proceeds to the processing in Step ST9. In the Step ST9, the control unit 205 causes the banding suppression processing unit 203 to execute inverse processing of the banding suppression processing executed on the transmitting side, and the state is returned to a previous state in which banding processing has not been executed.

Next, the control unit 205 recognizes the gradation number that can be displayed on the monitor (display unit 204) in Step ST10, and then proceeds to the processing in Step ST11. In the Step ST11, the control unit 205 determines whether the gradation number that can be displayed on the monitor (bit number) differs from the encoded bit number (bit number of the image data in the video stream). In the case of determining that there is no difference, the control unit 205 proceeds to Step ST13 immediately, and finishes control processing. In this case, the banding suppression processing is not executed in the banding suppression processing unit 203, and the input image data is output as it is.

On the other hand, in the case of determining that there is a difference, the control unit 205 causes the banding suppression processing unit 203 to execute the banding suppression processing in Step ST12. In this case, the filter of the suppression processing is changed in accordance with the level of difference. Further, in this case, the type of filter is changed in accordance with the gradation number before the gradation number reducing processing recognized in Step ST4, for example. Also, in this case, the filter of the suppression processing is changed in accordance with the bit number after decoding recognized in Step ST7 and the gradation number that can be displayed on the monitor recognized in Step ST10. After the processing in Step ST12, the control unit 205 proceeds to processing in Step ST13 and finishes the control processing.

Operation of the reception device 100 illustrated in FIG. 10 will be briefly described. In the receiving unit 201, the RF modulation signal received at the receiving antenna is demodulated, and the transport stream TS is obtained. Further, in the receiving unit 201, each stream such as the video stream included in the transport stream TS is extracted. The video stream extracted in the receiving unit 201 is supplied to the decoder 202.

Further, in the receiving unit 201, the picture processing descriptor (picture processing descriptor) is extracted from the transport stream TS (refer to FIG. 8(a)), and transmitted to the control unit 205. In the control unit 205, whether the banding suppressing information is inserted into the video stream is recognized from the description of the descriptor.

In the decoder 202, decoding processing is applied to the video stream, and the image data is generated. The image data is supplied to the banding suppression processing unit 203. Further, in the decoder 202, banding suppression processing information is extracted in accordance with the picture processing SEI message inserted into the video stream, and transmitted to the control unit 205.

In the banding suppression processing unit 203, the banding suppression processing is applied to the image data output from the decoder 202 under the control of the control unit 205. In this case, for example, when the image data is image data to which banding suppression processing should be applied and the banding suppression processing has not been applied to the image data, the banding suppression processing is applied to the decoded image data. Note that in the case where the banding suppression processing is not applied, the input image data is output from the banding suppression processing unit 203 as it is.

The image data output from the banding suppression processing unit 203 is supplied to the display unit 204. Further, the image in accordance with the image data is displayed on the display unit 204.

As described above, according to the image transmitting/receiving system 10 illustrated in FIG. 1, the banding suppression processing information for the image data is inserted into the video stream in the transmission device 100. The banding suppression processing information includes the information indicating whether the banding suppression processing should be applied to the image data, the information indicating whether the banding suppression processing has been applied to the image data, and so on. Therefore, in the reception device 200, the banding suppression processing can be appropriately executed based on the banding suppression processing information.

Further, according to the image transmitting/receiving system 10 illustrated in FIG. 1, the identifying information indicating whether the banding suppression processing information is inserted into the video stream is inserted into the layer of the transport stream TS in the transmission device 100. Therefore, in the reception device 200, it is possible to detect whether the banding suppression processing information is inserted into the video stream without decoding the video stream, and the information can be appropriately extracted.

2. Modified Example

In the above-described embodiment, note that an example in which a container is a transport stream (MPEG-2 TS) is provided. However, the present technology can be also applied to a system having a configuration in which delivery to a receiving terminal is executed by utilizing a network such as the Internet. In the Internet delivery, delivery is generally executed by a container having an MP4 format or other formats.

Figure 13:
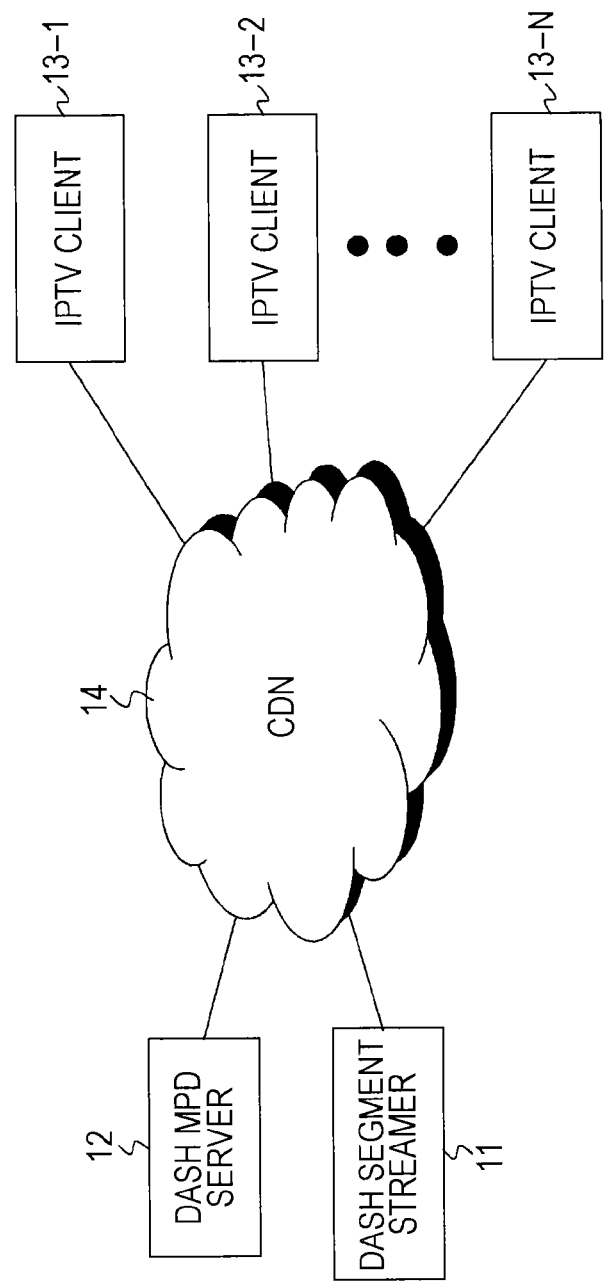
FIG. 13 is a block diagram illustrating an exemplary configuration of a stream delivery system based on DASH.

FIG. 13 is an exemplary configuration of a stream delivery system 10A. The stream delivery system 10A is a stream delivery system based on MPEG-DASH. The stream delivery system 10A has a configuration in which a DASH segment streamer 11 and a DASH MPD server 12 are connected to N pieces of IPTV clients 13-1, 13-2, . . . , 13-N via a content delivery network (CDN) 14.

The DASH segment streamer 11 generates a stream segment according to DASH specifications (hereinafter referred to as "DASH segment") based on media data of predetermined content (video data, audio data, caption data, etc.), and transmits the segment in response to an HTTP request from the IPTV client. The DASH segment streamer 11 is a Web server.

Further, the DASH segment streamer 11 transmits a segment of a stream to a requestor, namely, the IPTV client 13 via a CDN 14 in response to the request for the segment of the predetermined stream transmitted from the IPTV client 13 (13-1, 13-2, . . . , 13-N) via the CDN 14. In this case, the IPTV client 13 refers to a rate value described in a media presentation description (MPD) file, and selects a stream having the most suitable rate in accordance with a state of network environment where the client is disposed.

The DASH MPD server 12 is a server configured to generate an MPD file in order to obtain the DASH segment generated in the DASH segment streamer 11. The MPD file is generated based on content metadata from a content management server (not illustrated in FIG. 13) and an address (url) of the segment generated in the DASH segment streamer 11.

In the MPD format, respective properties of each stream of a video, audio, etc. is described using an element called Representation. For example, in the MPD file, Representations are formed divided by different rates of a plurality of video data streams, and the respective rates are described in the respective Representations. The IPTV client 13 refers to values of the rates, and can select the most suitable stream in accordance with the state of network environment where the IPTV client 13 is disposed as described above.

Figure 14:
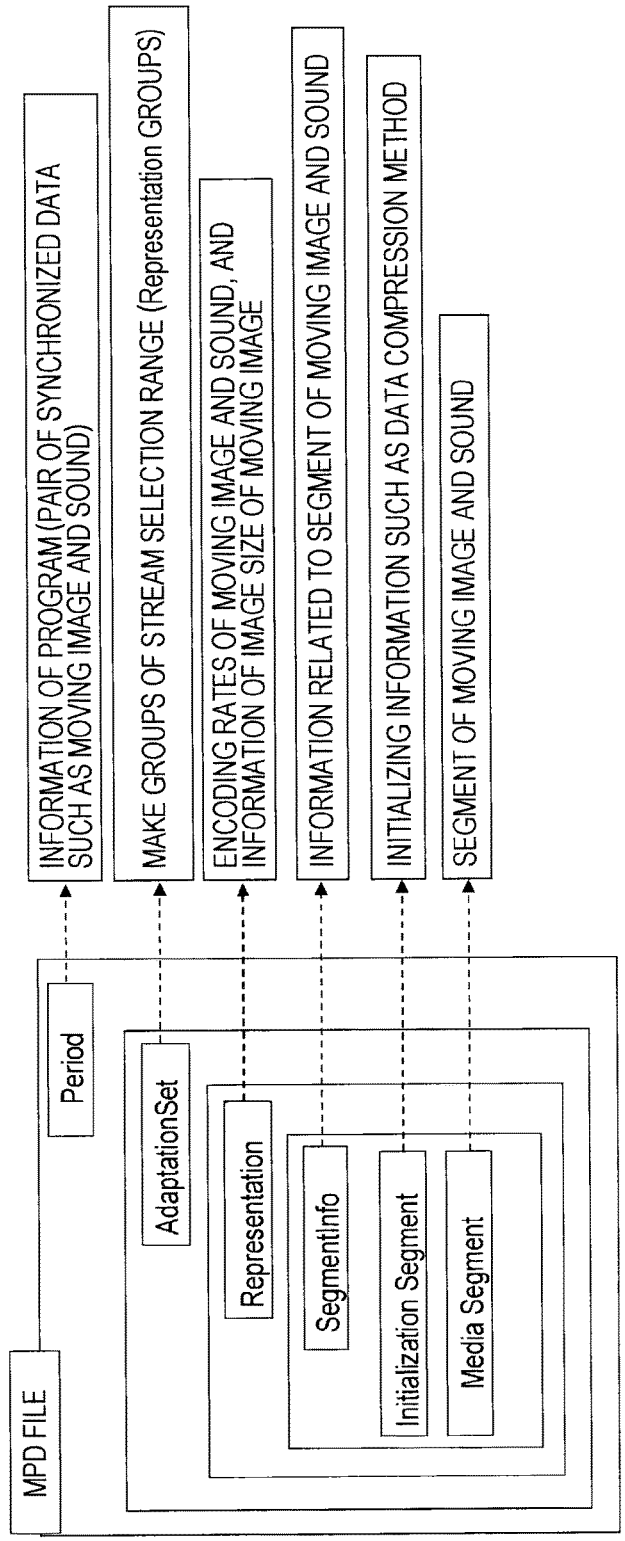
FIG. 14 is a diagram illustrating a hierarchical structure of an MPD file.

The MPD file has a hierarchical structure as illustrated in FIG. 14. In the MPD file, information such as a compression method, an encoding rate, an image size and a language stored in the DASH segment streamer 11 is hierarchically described in an XML format. The MPD file hierarchically includes structures such as a Period, an AdaptationSet, a Representation, a SegmentInfo, an Initialization Segment, and a Media Segment.

The Period structure has information of program (a pair of synchronized data, such as a moving image and sound). Further, the AdaptationSet structure included in the Period structure makes groups of stream selection range (Representation groups). Further, the Representation structure included in the AdaptationSet structure has information such as encoding rates of the moving image and sound, and a sound size of the moving image.

Further, the SegmentInfo structure included in the Representation structure has information related to the segment of the moving image and sound. Further, the Initialization Segment structure included in the SegmentInfo structure has initializing information such as a data compression method. Further, the Media Segment structure included in the SegmentInfo structure has information such as an address to obtain a segment of the moving image and sound.

Figure 15:
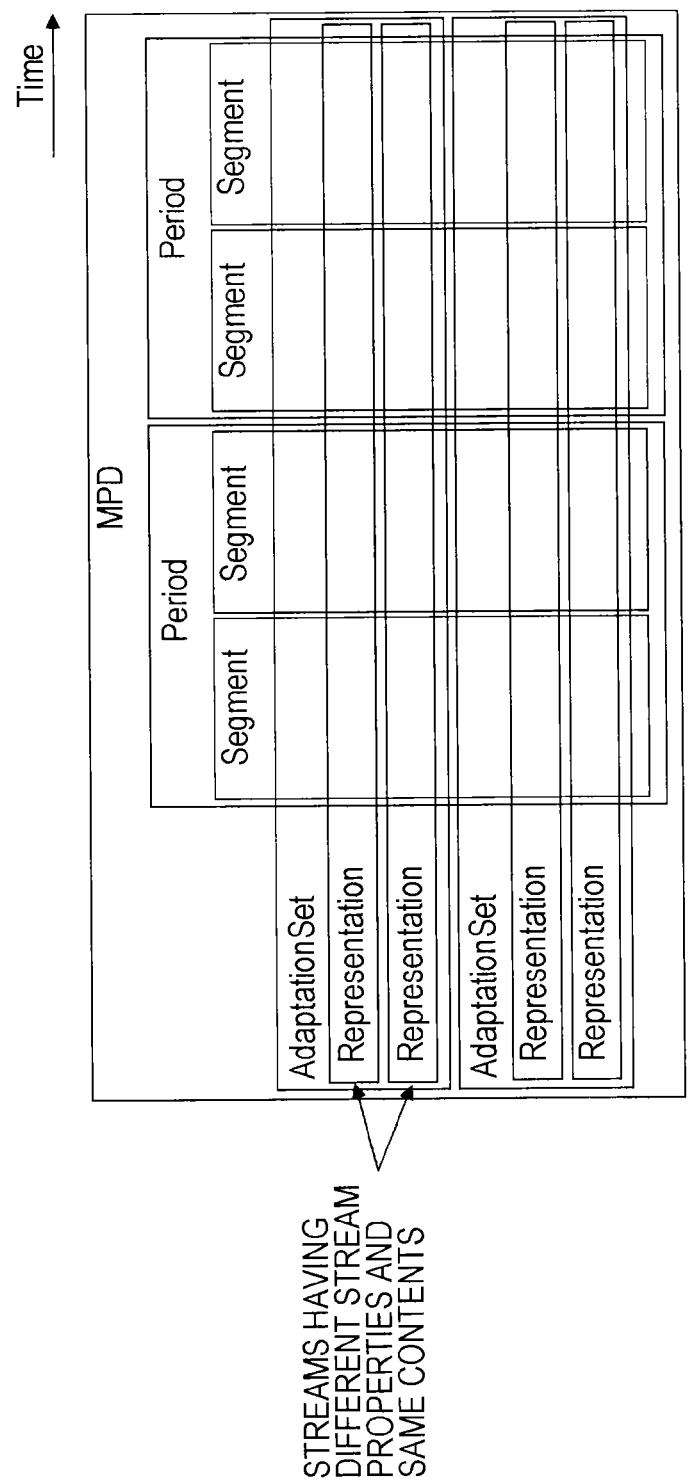
FIG. 15 is a diagram illustrating an example of respective structures included in the MPD file by arranging the structures in a temporal axis.

FIG. 15 is a diagram illustrating an example of respective structures included in the MPD file by arranging the structures in a temporal axis. In this example, the MPD file includes the two Periods, and each of the Periods includes the two Segments. Further, in this example, each Period includes two AdaptationSets, and each AdaptationSet includes two Representations related to streams having different stream properties and the same contents.

Figure 16:
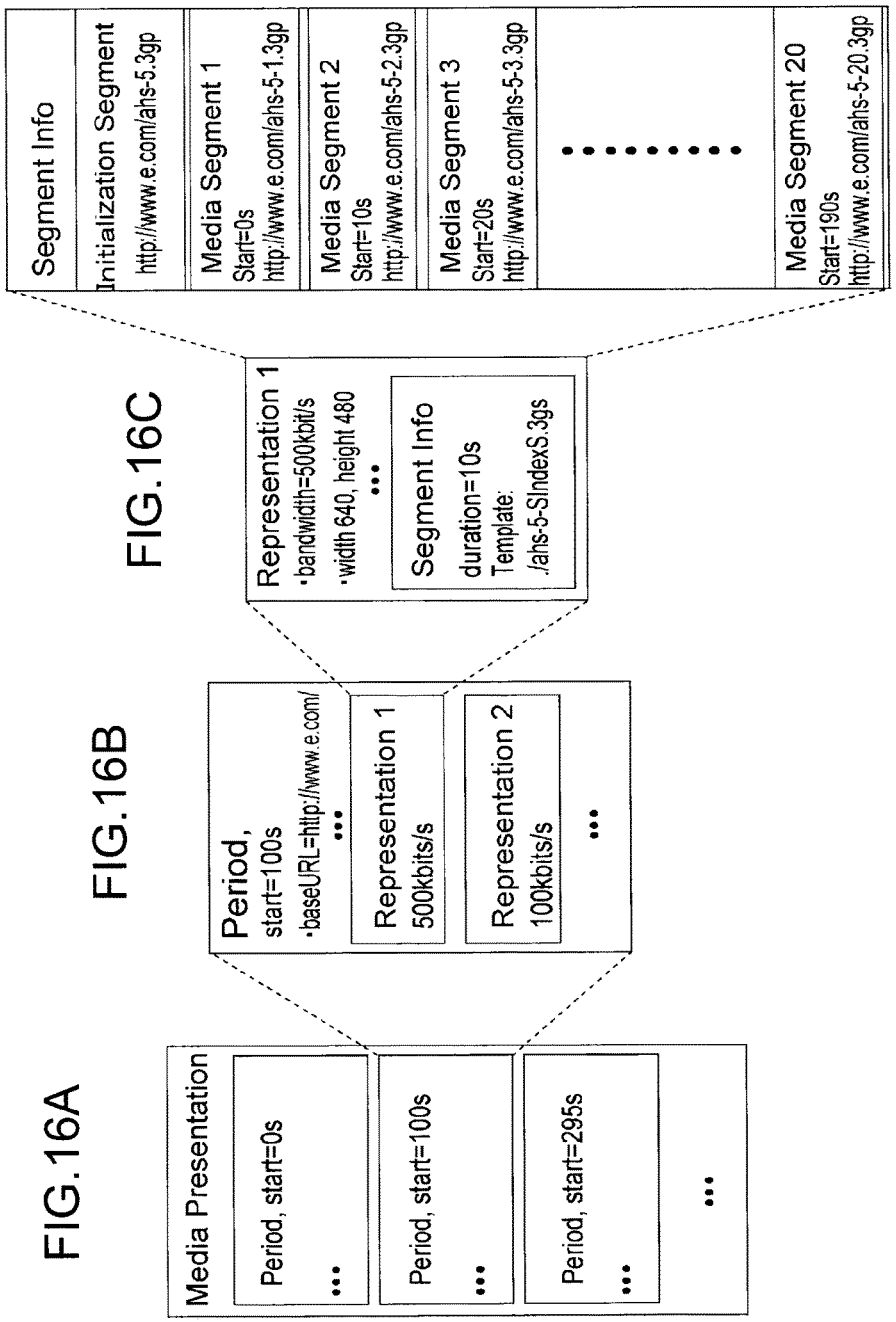
FIGS. 16A-16D are diagrams illustrating an exemplary relation between respective structures hierarchically arranged in the MPD file.

FIGS. 16A-16D are diagrams illustrating an exemplary relation between respective structures hierarchically arranged in the MPD file. As illustrated in FIG. 16A, there is a plurality of Periods divided by time intervals in Media Presentation as an entire MPD file. For example, a first Period starts from zero second, and a next Period starts from 100 seconds.

As illustrated in 16B, there is a plurality of Representations in the Period. In the plurality of Representations, there are Representation groups formed at the above-described AdaptationSet and associated with the video data streams having the same contents and the different stream properties such as rates.

As illustrated in FIG. 16C, the SegmentInfo is included in the Representation. In the SegmentInfo, as illustrated in FIG. 16D, there are Initialization Segment and a plurality of Media Segments in which information for respective Segments formed by further dividing the Period into small pieces is described. In the Media Segment, there is information of an address (url) to actually obtain Segment data such as a video and audio.

Note that the stream can be freely switched among the plurality of Representations groups formed at the AdaptationSet. With this configuration, the stream having the most suitable rate can be selected in accordance with the state of network environment where the IPTV client is disposed, and seamless moving image can be delivered.

Figure 17:
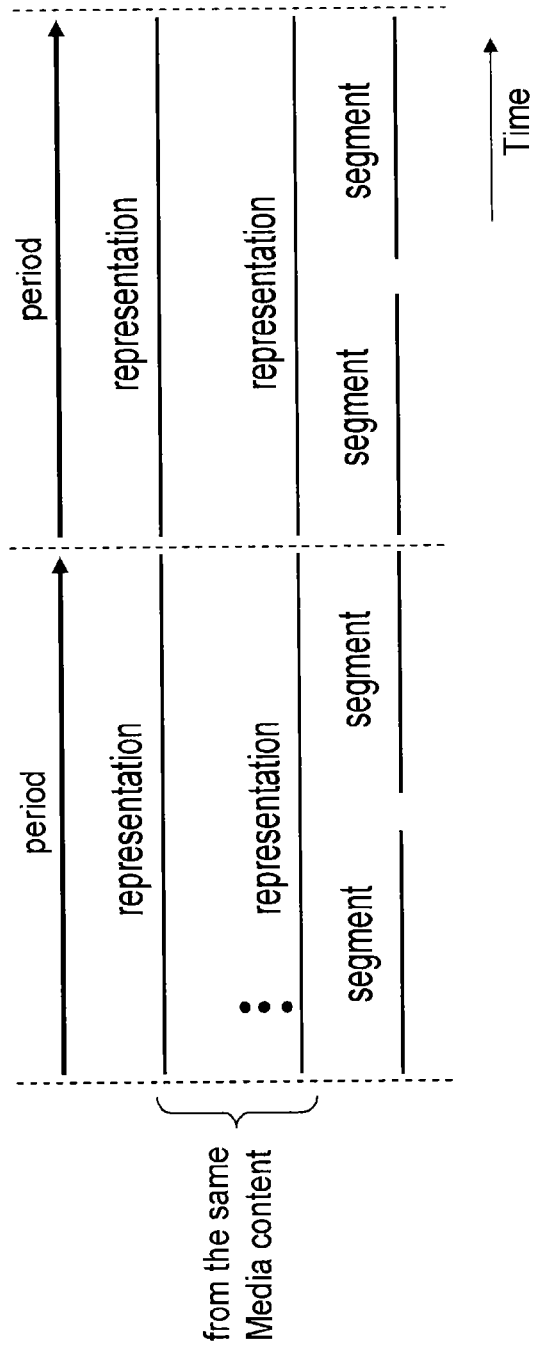
FIG. 17 is a diagram illustrating an exemplary relation between Period, Representation, and Segment.

FIG. 17 is a diagram illustrating an exemplary relation between the Period, Representation, and Segment. In this example, the MPD file includes the two Periods, and each of the Periods includes the two Segments. Further, in this example, each Period includes a plurality of Representations related to same media content.

Figure 18:
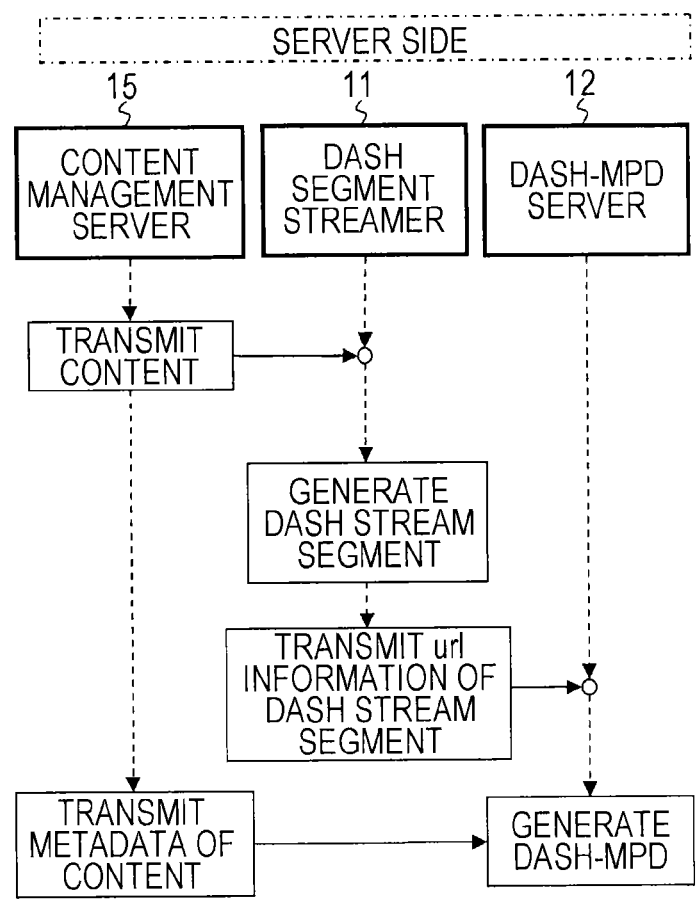
FIG. 18 is a diagram illustrating an exemplary flow of generating a DASH segment and a DASH MPD file from content.

FIG. 18 is a diagram illustrating an exemplary flow of generating a DASH Segment and a DASH MPD file from content. The content is transmitted from a content management server 15 to the DASH segment streamer 11. The DASH segment streamer 11 generates a DASH segment of each data stream based on video data, audio data, etc. constituting the content.

Further, the DASH segment streamer 11 transmits information of an address (url) of the generated DASH segment of each data stream to the DASH MPD server 12. The content management server 15 transmits metadata of the content to the DASH MPD server 12. The DASH MPD server 12 generates a DASH MPD file based on the address information of the DASH segment of each data stream and the metadata of the content.

Figure 19:
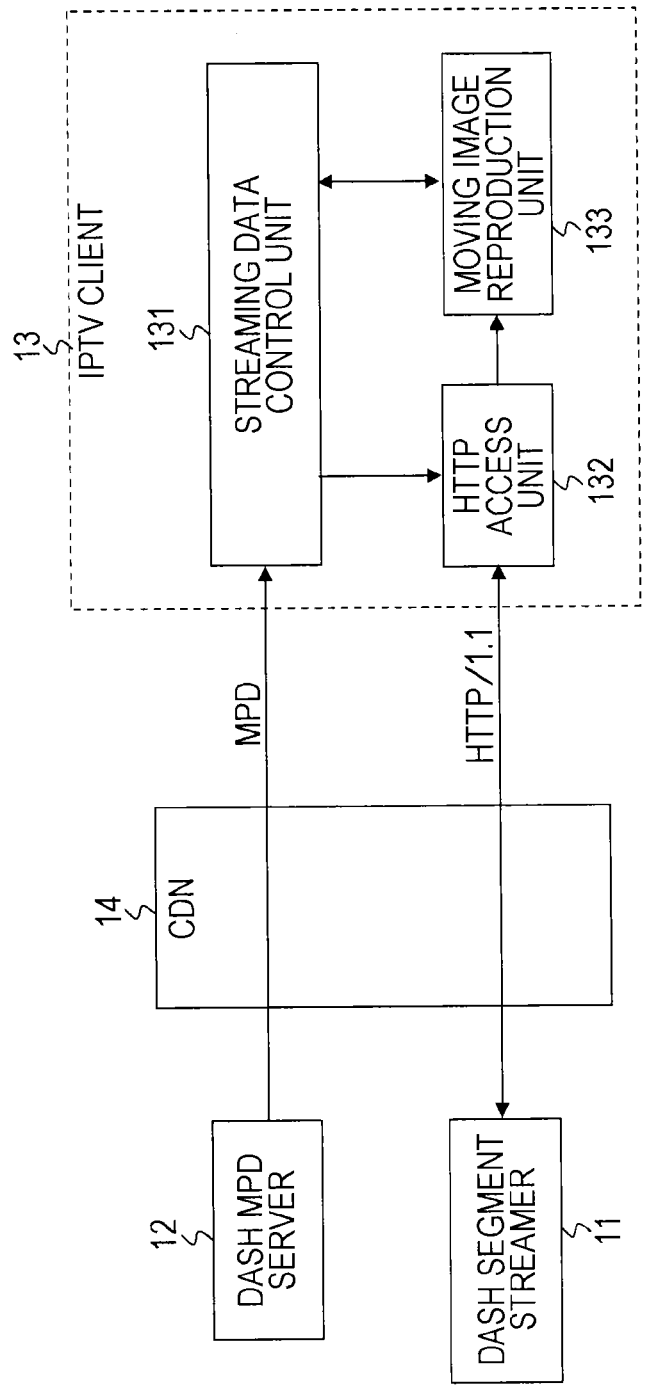
FIG. 19 is a diagram illustrating an exemplary configuration of an IPTV client constituting the stream delivery system.

FIG. 19 is a diagram illustrating an exemplary configuration of the IPTV client 13 (13-1 to 13-N). The IPTV client 13 includes a streaming data control unit 131, an HTTP access unit 132, and a moving image reproduction unit 133. The streaming data control unit 131 obtains the MPD file from the DASH MPD server 12, and analyzes contents thereof.

The HTTP access unit 132 requests the segment of the moving image and sound used to reproduce the moving image from the DASH segment streamer 11. At this point, considering a screen size, a state of transmission path, etc. of the IPTV client 13, a stream having the most suitable image size and encoding rate is selected. For example, in an initial stage, a request is made for a segment of a stream having a slow encoding rate, and in the case where a communication state is good, the request is switched to a segment of a stream having high encoding rate.

The HTTP access unit 132 transmits the received moving image and sound to the moving image reproduction unit 133. The moving image reproduction unit 133 applies decoding processing to the each segment transmitted from the HTTP access unit 132 to obtain content of one moving image, and reproduces the moving image and sound. Note that processing in the respective units of the IPTV client 13 is executed by software.

Figure 20:
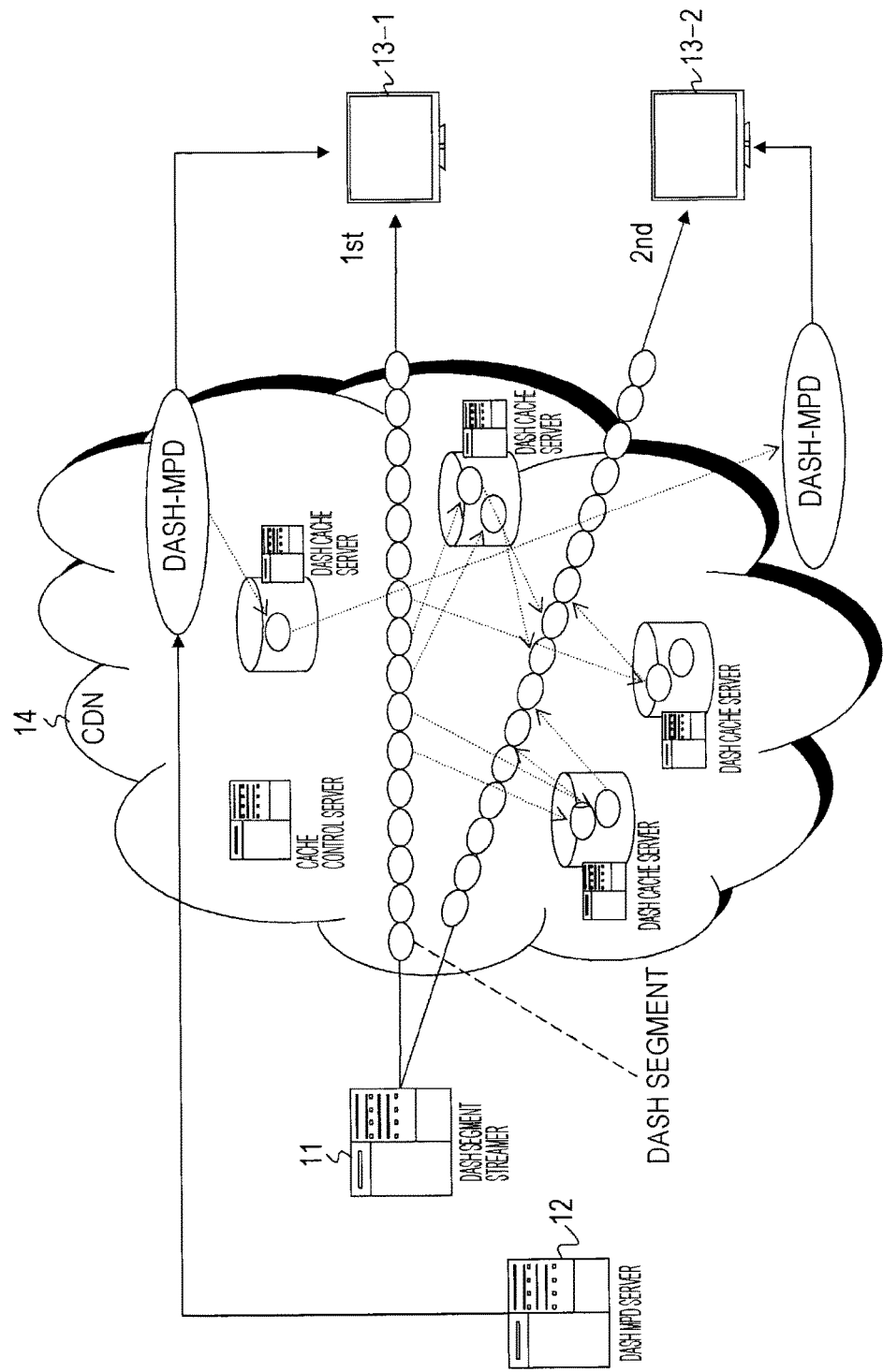
FIG. 20 is a diagram illustrating a general system of a stream delivery system based on DASH.

FIG. 20 is a diagram illustrating a general system of the stream delivery system based on DASH. All of the DASH MPD file and the DASH segment are delivered via the content delivery network (CDN) 14. The CDN 14 has a configuration in which a plurality of cache servers (DASH cache servers) is arranged in a network formation.

The cache server receives an HTTP request in order to obtain the MPD file from the IPTV client 13. When the MPD file exists in a local MPD cache, the cache server returns the same to the IPTV client 13 as an HTTP response. Further, when the file does not exist in the local MPD cache, the cache server transfers the request to the DASH MPD server 12 or a host cache server. Further, the cache server receives the HTTP response in which the MPD file is stored, and transfers the same to the IPTV client 13, and further executes cache processing.

Further, the cache server receives the HTTP request for obtaining the DASH segment from the IPTV client 13. When the segment is in a local segment cache, the cache server returns the segment to the IPTV client 13 as the HTTP response. Further, when the DASH segment does not exist in the local segment cache, the cache server returns the request to the DASH segment streamer 11 or the host cache server. Then, the cache server receives the HTTP response in which the DASH segment is stored, and transfers the same to the IPTV client 13, and further executes the cache processing.

In the CDN 14, the DASH segment to be delivered to the IPTV client 13-1 which has issued the HTTP request first is temporarily cached at the cache server located on a route, and the cached DASH segment is delivered in response to an HTTP request from another subsequent IPTV client 13-2. Therefore, delivery efficiency of HTTP streaming with respect to a large number of IPTV clients can be improved.

The CDN 14 includes predetermined number of cache control servers in addition to the plurality of cache servers. The cache control server creates cache control policy based on an index related to cache for the DASH segment of each video data stream included in the MPD file, and delivers the policy to each of the cache servers. Each of the cache servers executes cache processing to the DASH segment of each video data stream based on the cache control policy.

Figure 21:
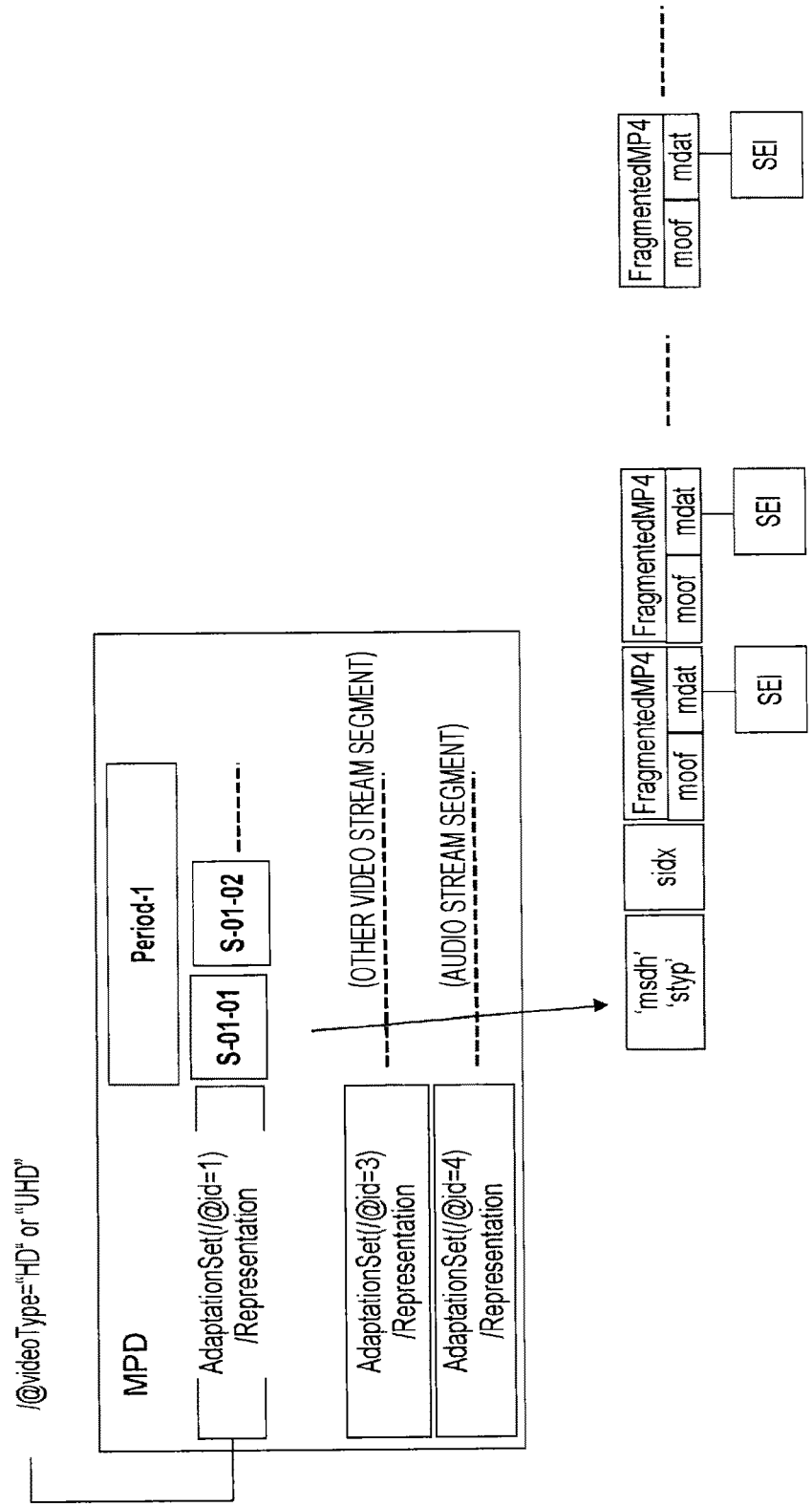
FIG. 21 is a diagram illustrating an exemplary structure of a FragmentedMP4 stream including a video stream.
Figure 22A:
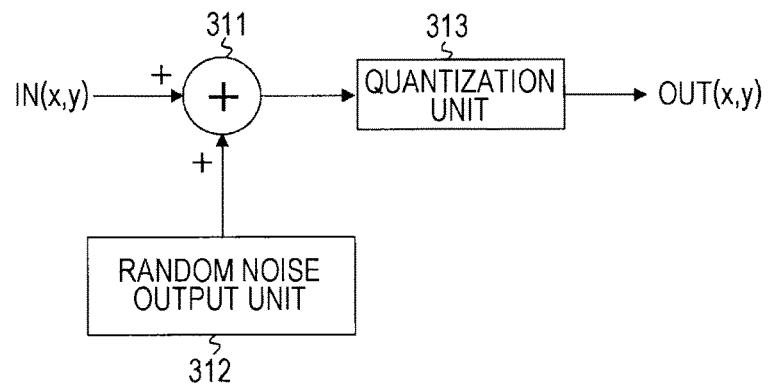
FIGS. 22A to 22C are diagrams for describing a random dither method, a systematic dither method, and an error diffusion method as the banding suppression processing.
Figure 22B:
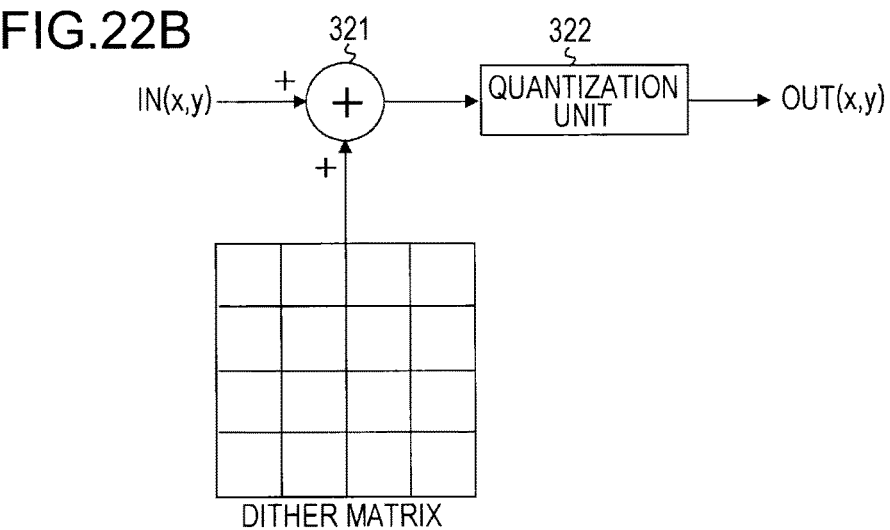
Figure 22C:
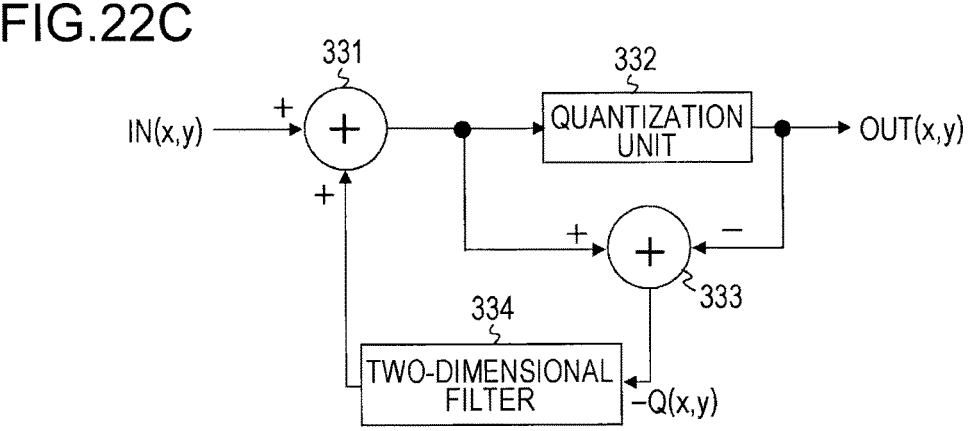

FIG. 21 is a diagram illustrating an exemplary configuration of a FragmentedMP4 stream. The FragmentedMP4 stream of a video includes FragmentedMP4 obtained by packetizing a video stream. A predetermined picture portion of the video stream is inserted into a "mdat" portion of the FragmentedMP4. A picture processing SEI message is inserted into the video stream per picture in the same manner as the above-described embodiment. By this, the banding suppression processing information is transmitted to the IPTV client 13 which is the reception device. Further, same as the above-described embodiment, banding suppression processing can be controlled in the IPTV client 13 based on the banding suppression processing information.

Meanwhile, in addition to the case where the Picture Processing SEI (banding suppression processing information) is inserted into the video stream as described above, the Picture Processing SEI can be transmitted by the MPD file. In this case, an ID is newly assigned by the AdaptationSet, and only the Picture Processing SEI is defined by a new Representation together with the video stream. Further, there may be a case where the transport stream TS is transmitted by DASH as it is. In this case, the transport stream TS inserted with the picture processing descriptor (picture_processing descriptor) is transmitted as it is.

Further, according to the above-described embodiment, the example of applying the present technology to the transmitting/receiving system for image data, but needless to mention, the present technology is applicable to a transmitting/receiving system for audio data. In this case, on the transmitting side, quantized noise suppression processing information (equivalent to the banding suppression processing information in the above-described embodiment) will be inserted into an audio stream in predetermined time units. Further, on the receiving side, quantized noise suppression processing is executed based on the quantized noise suppression processing information transmitted from the transmitting side.

Further, the present technology can have following configurations.

(1) A transmission device including: a transmitting unit configured to transmit a container having a predetermined format and including a video stream including encoded image data; and an information inserting unit configured to insert information related to banding suppression processing for the image data into the video stream.

(2) The transmission device according to (1), wherein the information related to banding suppression processing includes information indicating whether banding suppression processing has been applied to the image data.

(3) The transmission device according to (2), wherein the information related to banding suppression processing includes information indicating a type of banding suppression processing applied to the image data.

(4) The transmission device according to any of (1) to (3), wherein the information related to banding suppression processing includes information indicating whether banding suppression processing should be applied to the image data.

(5) The transmission device according to any of (1) to (4), wherein the information related to banding suppression processing includes information indicating whether gradation number reducing processing has been applied to the image data.

(6) The transmission device according to (5), wherein the information related to banding suppression processing includes information indicating a gradation number before the gradation number reducing processing.

(7) The transmission device according to any of (1) to (6), wherein the information inserting unit inserts the information related to banding suppression processing into the video stream per picture or per scene.

(8) The transmission device according to any of (1) to (7), further comprising an identifying information inserting unit configured to insert, into a layer of the container, identifying information indicating whether the information related to banding suppression processing is inserted into the video stream.

(9) The transmission device according to (8), wherein the container is a transport stream, and the identifying information inserting unit inserts the identifying information under a video elementary loop of a program map table included in the transport stream.

(10) The transmission device according to any of (1) to (9), wherein the transmitting unit transmits the container having the predetermined format in response to a request from a receiving side.

(11) A transmitting method, including: transmitting a container having a predetermined format and including a video stream including encoded image data; and inserting information related to banding suppression processing for the image data into the video stream.

(12) A reception device including: a receiving unit configured to receive a container having a predetermined format and including a video stream, the video stream including encoded image data and inserted with information related to banding suppression processing for the image data; a decoding unit configured to decode the video stream and obtain image data; a processing unit configured to apply banding suppression processing to the decoded image data; and a control unit configured to control the processing unit based on the information related to banding suppression processing, inserted into the video stream.

(13) The reception device according to (12), wherein the information related to banding suppression processing includes information indicating whether banding suppression processing should be applied to the image data and information indicating whether the banding suppression processing has been applied to the image data, and the control unit controls the banding suppression processing to be applied to the decoded image data when the image data is the image data to which banding suppression processing should be applied and further the banding suppression processing has not been applied to the image data.

14) A receiving method, including: receiving a container having a predetermined format and including a video stream, the video stream including encoded image data and inserted with information related to banding suppression processing for the image data; decoding the video stream to obtain image data; and applying banding suppression processing to the decoded image data based on the information related to banding suppression processing, inserted into the video stream.

(15) A reception device, including: a receiving unit configured to receive a container having a predetermined format and including a video stream including encoded image data; a decoding unit configured to decode the video stream and obtain image data; a processing unit configured to apply banding suppression processing to the decoded image data; and a control unit configured to control the processing unit such that banding suppression processing is applied to the decoded image data when a gradation number that can be displayed on a display unit configured to display an image based on the decoded image data differs from a bit number of image data in the video stream.

The main characteristic of the present technology is that the banding suppression processing can be appropriately executed on the receiving side by inserting, into the video stream, the banding suppression processing information (picture processing SEI message) including the information indicating whether the banding suppression processing should be applied to the image data, the information indicating whether the banding suppression processing is applied to the image data, and so on (refer to FIG. 9). Further, the main characteristic of the present technology is that when the gradation number that can be displayed on the display unit configured to display the image based on the decoded image data differs from the bit number of the image data in the video stream, the banding suppression processing can be properly executed on the receiving side by applying the banding suppression processing to the decoded image data (refer to FIG. 12).

REFERENCE SIGNS LIST

10 Image transmitting/receiving system
10A Stream delivery system
11 DASH segment streamer
12 DASH MPD server
13, 13-1 to 13-N IPTV client
14 CDN
15 Content management server
61, 71, 73 Arithmetic unit
62 Hyper pass filter
63 Random noise output unit
64, 75 Coefficient setting unit
72 Quantization unit
74 Primary filter
100 Transmission device
101 Camera
102 Banding suppression processing unit
103 Encoder
131 Streaming data control unit
132 HTTP access unit
133 Moving image reproduction unit
104 Transmitting unit
200 Reception device
201 Receiving unit
202 Decoder
203 Banding suppression processing unit
204 Display unit
205 Control unit

The invention claimed is:

1. A transmission device, comprising:
circuitry configured to
perform bit depth reduction processing on high bit depth image data to generate reduced bit depth image data, the high bit depth image data having a higher bit depth than the reduced bit depth image data;
transmit a container including a video stream, the video stream including the reduced bit depth image data; and
insert information related to banding suppression processing for the reduced bit depth image data into the video stream, the information including first information indicating whether the banding suppression processing is to be applied to the reduced bit depth image data included in the video stream, wherein
the band suppression processing is applied to the reduced bit depth image data included in the video stream, when the reduced bit depth image data is decoded, based on the information related to banding suppression processing inserted into the video stream.

2. A reception device, comprising:
circuitry configured to
receive a container including a video stream, the video stream including reduced bit depth image data and information related to banding suppression processing for the reduced bit depth image data, the information including first information indicating whether the banding suppression processing is to be applied to the reduced bit depth image data included in the video stream, and the reduced bit depth image data being generated from high bit depth image data having a higher bit depth than the reduced bit depth image data;
decode the reduced bit depth image data in the video stream to obtain decoded image data; and
apply the banding suppression processing to the decoded image data based on the information related to banding suppression processing included in the video stream.

3. The reception device according to claim 2, wherein the information related to banding suppression processing includes second information indicating whether the banding suppression processing has been applied to the reduced bit depth image data.

4. The reception device according to claim 3, wherein the information related to banding suppression processing includes third information indicating a type of the banding suppression processing applied to the reduced bit depth image data.

5. The reception device according to claim 2, wherein the information related to banding suppression processing includes fourth information indicating whether gradation number reducing processing has been applied to the reduced bit depth image data.

6. The reception device according to claim 5, wherein the information related to banding suppression processing includes fifth information indicating a gradation number before the gradation number reducing processing.

7. The reception device according to claim 2, wherein the information related to banding suppression processing is inserted into the video stream per a picture or per a scene.

8. The reception device according to claim 2, wherein identifying information indicating whether the information related to banding suppression processing is inserted into the video stream.

9. The reception device according to claim 8, wherein the container is a transport stream, and the identifying information is inserted under a video elementary loop of a program map table included in the transport stream.

10. The reception device according to claim 2, wherein the circuitry is configured to receive the container in response to a request sent by the circuitry.

11. The reception device according to claim 2, wherein and
the circuitry is configured to control the banding suppression processing to be applied to the decoded image data when the information related to banding suppression processing indicates the banding suppression processing is to be applied to the decoded image data and the banding suppression processing has not been applied to the reduced bit depth image data.

12. The reception device according to claim 2, wherein the information related to banding suppression processing indicates one of a random dither method, a systematic dither method, or an error diffusion method.

13. The reception device according to claim 2, further comprising:
a display.

14. The reception device according to claim 2, wherein the circuitry is configured to determine whether to apply the banding suppression processing based on the information related to banding suppression processing inserted in the video stream.

15. A transmitting method, comprising:
perform bit depth reduction processing on high bit depth image data to generate reduced bit depth image data, the high bit depth image data having a higher bit depth than the reduced bit depth image data;
transmitting, by a transmitter of a transmission device, a container including a video stream, the video stream including the reduced bit depth image data; and
inserting, by circuitry of the transmission device, information related to banding suppression processing for the reduced bit depth image data into the video stream, the information including first information indicating whether the banding suppression processing is to be applied to the reduced bit depth image data included in the video stream, wherein
the band suppression processing is applied to the reduced bit depth image data included in the video stream, when the reduced bit depth image data is decoded, based on the information related to banding suppression processing inserted into the video stream.

16. A receiving method, comprising:
receiving, by a receiver of a reception device, a container including a video stream, the video stream including reduced bit depth image data and information related to banding suppression processing for the reduced bit depth image data, the information including first information indicating whether the banding suppression processing is to be applied to the reduced bit depth image data included in the video stream, and the reduced bit depth image data being generated from high bit depth image data having a higher bit depth than the reduced bit depth image data;
decoding, by circuitry of the reception device, the reduced bit depth image data in the video stream to obtain decoded image data; and
applying, by the circuitry, the banding suppression processing to the decoded image data based on the information related to banding suppression processing included in the video stream.

17. A reception device, comprising:
circuitry configured to
receive a container including a video stream including encoded image data and information related to banding suppression processing for the encoded image data;
decode the video stream to obtain decoded image data;
apply the banding suppression processing to the decoded image data such that the banding suppression processing is applied to the decoded image data when a gradation number that is supported by a display that is configured to display an image based on the decoded image data differs from a bit number of the image data in the video stream.

18. The reception device according to claim 17, wherein the encoded image data included in the video stream is reduced bit depth image data, and
the information indicates whether the banding suppression processing is to be applied to the encoded image data included in the video stream.

* * * * *